(12) United States Patent
Komura

(10) Patent No.: US 7,702,320 B2
(45) Date of Patent: Apr. 20, 2010

(54) SOUND REPRODUCING SYSTEM IN PORTABLE INFORMATION TERMINAL AND METHOD THEREFOR

(75) Inventor: Tatsumi Komura, Tokyo (JP)

(73) Assignee: NEC Corporation, Tokyo (JP)

( * ) Notice: Subject to any disclaimer, the term of this patent is extended or adjusted under 35 U.S.C. 154(b) by 1078 days.

(21) Appl. No.: 10/381,350

(22) PCT Filed: Sep. 19, 2001

(86) PCT No.: PCT/JP01/08122

§ 371 (c)(1),
(2), (4) Date: Jul. 25, 2003

(87) PCT Pub. No.: WO02/28064

PCT Pub. Date: Apr. 4, 2002

(65) Prior Publication Data

US 2004/0023697 A1  Feb. 5, 2004

(30) Foreign Application Priority Data

Sep. 27, 2000  (JP) .............................. 2000-295030

(51) Int. Cl.
*H04R 1/10* (2006.01)
*H04M 11/00* (2006.01)

(52) U.S. Cl. .................. 455/416; 381/17; 381/152; 381/182; 381/189; 381/190; 345/156; 235/487

(58) Field of Classification Search ............. 455/550.1, 455/564, 563, 467, 350, 568, 569.1, 90.1, 455/575.1, 90.3, 95, 416; 381/17, 300, 189, 381/190, 182, 310, 396, 423, 152
See application file for complete search history.

(56) References Cited

U.S. PATENT DOCUMENTS

| 4,209,665 | A | * | 6/1980 | Iwahara | 381/310 |
|---|---|---|---|---|---|
| 4,450,495 | A | * | 5/1984 | Naruki | 360/137 |
| 5,113,428 | A | * | 5/1992 | Fitzgerald | 455/575.2 |
| 5,172,415 | A | * | 12/1992 | Fosgate | 381/22 |
| 6,006,115 | A | * | 12/1999 | Wingate | 455/575.2 |
| 6,321,080 | B1 | * | 11/2001 | Diethorn | 455/416 |
| 6,356,641 | B1 | * | 3/2002 | Warnaka et al. | 381/190 |
| 6,360,110 | B1 | * | 3/2002 | Schmidt | 455/564 |
| 6,434,407 | B1 | * | 8/2002 | Cook | 455/569.1 |
| 6,442,277 | B1 | * | 8/2002 | Lueck et al. | 381/17 |
| 6,522,763 | B2 | * | 2/2003 | Burleson et al. | 381/189 |
| 6,628,798 | B2 | * | 9/2003 | Teshima et al. | 381/396 |
| 6,721,436 | B1 | * | 4/2004 | Bertagni et al. | 381/423 |
| 6,744,895 | B2 | * | 6/2004 | Miyamoto et al. | 381/182 |
| 6,751,446 | B1 | * | 6/2004 | Kim et al. | 455/90.1 |

(Continued)

FOREIGN PATENT DOCUMENTS

JP     08-171477     7/1996

(Continued)

OTHER PUBLICATIONS

Nokia 9210 Communicator User Guide, 2000.*

*Primary Examiner*—William D Cumming
(74) *Attorney, Agent, or Firm*—Michael Best & Friedrich LLP

(57) ABSTRACT

A portable information terminal having high adaptability and high convenience with respect to operating environment, and by which comfortable and high-quality sounds can be reproduced is provided. A sound reproducing system in a portable information terminal 1, wherein the portable information terminal is provided with at least two acoustic loudspeakers 2a and 2b; and the at least two acoustic loudspeakers are driven simultaneously to compensate their reproduced sounds with each other.

40 Claims, 40 Drawing Sheets

U.S. PATENT DOCUMENTS

| | | | |
|---|---|---|---|
| 6,771,778 B2 * | 8/2004 | Kirkeby | 381/17 |
| 6,777,626 B2 * | 8/2004 | Takabatake et al. | 200/5 A |
| 6,804,364 B1 * | 10/2004 | De Jonge | 381/381 |
| 6,819,939 B2 * | 11/2004 | Masamura | 455/550.1 |
| 6,824,063 B1 * | 11/2004 | Wallace et al. | 235/487 |
| 6,865,277 B2 * | 3/2005 | Bank et al. | 381/152 |
| 6,882,335 B2 * | 4/2005 | Saarinen | 345/156 |
| 7,069,058 B2 * | 6/2006 | Kawashima | 455/567 |
| 2003/0142842 A1 * | 7/2003 | Arai et al. | 381/300 |
| 2004/0023697 A1 * | 2/2004 | Komura | 455/569.1 |
| 2004/0229594 A1 * | 11/2004 | Jung et al. | 455/350 |

FOREIGN PATENT DOCUMENTS

| | | |
|---|---|---|
| JP | 08-307981 | 11/1996 |
| JP | 09-120354 | 5/1997 |
| JP | 09-247249 | 9/1997 |
| JP | 10-108300 | 4/1998 |
| JP | 10-276250 | 10/1998 |
| JP | 11-055751 | 2/1999 |
| JP | 2000-050377 | 2/2000 |
| JP | 2000-224269 | 8/2000 |
| WO | EP001713305 A1 * | 10/2006 |

* cited by examiner (a)     (b)

(a) DOTTED LINE: CROSS TALK (b)

(a) DOTTED LINE: CROSS TALK (b)

(a)

(b)

SOUND REPRODUCING SYSTEM IN PORTABLE INFORMATION TERMINAL AND METHOD THEREFOR

TECHNICAL FIELD

The present invention relates to portable information terminals, including radio telephone, such as cellular phone, PHS (Personal Handy Phone System), cordless phone, cordless handset of extension phone, and PDA (Personal Digital Assistants), and particularly to a sound reproducing system in portable information terminals for realizing sound reproduction of high acousticity and a method therefor.

BACKGROUND ART

With respect to installation of speakers and the like in portable information terminals such as conventional cellular phone, ringer for sounding bell sounds, micro motor for producing vibrations or the like has been attached to a cabinet for portable information terminals as a means for receiving call incoming.

Furthermore, it is usual to attach a micro speaker for reproducing received sounds or amplifying recorded messages, and a microphone for collecting voice being fundamental functions in portable information terminal, respectively.

Japanese Laid-Open Patent No. H10-276250 discloses that stereo sounds are listened by users with the use of earphones or headphones in portable information terminals.

In this case, however, there are such disadvantages that unpleasant ache appears at a position where user's ears are in contact with a earphone or a headphone for a long period of time, and that the earphone or headphone must be carried together with the portable information terminal in case of user's movement. Besides, plural persons cannot listen stereo sounds at the same time, so that there has been such a problem that it is insufficient in view of comfortableness and convenience.

Moreover, Japanese Laid-Open Patent No. H8-171477 discloses a workstation and the like for personal computer (PC), and Japanese Laid-Open Patent No. H9-120354 discloses reproduction of stereo sounds by means of a loudspeaker without accompanying an earphone and a headphone with respect to notebook-size personal computer.

In reproduction of stereo sounds through loudspeakers, spatial extensity is required for a sound source, while there is a possibility of appearing cross talk as mentioned hereunder, which is not experienced by the use of earphones or headphones. For this reason, a distance defined between right and left loudspeakers must be maintained at a given distance or more, and an acoustic pressure difference and a phase difference between both ears of an audience must be maintained at a given value or more, respectively, with respect to the right and left loudspeakers.

In this connection, when a distance defined between the right and left loudspeakers is made to be small so that an acoustic pressure difference and a phase difference between ears of the audience decrease respectively, with respect to the right and left loudspeakers, stereo sound effects decrease due to cross talk, resulting in substantially monaural sounds.

In this respect, since a portable information terminal is more compact than the above-described personal computer and the like, a distance between right and left loudspeakers becomes narrower, so that it is difficult to maintain stereo sound effects, whereby there is such a problem that it is difficult to reproduce stereo sounds with high acousticity.

Incidentally, a tendency of multimedia portable information terminal becomes remarkable in recent years, so that mass storage data such as picture image and music must be handled because of increase in a capacity of built-in memory, introduction of a storage medium, and high-speed of communication in portable information terminals.

Moreover, an ownership ratio of portable information terminals including cellular phone is remarkable, and in addition, many persons take along such portable information terminal in case of outing, so that there is a task for elevating convenience to add other extra functions to portable information terminals.

In order to listen high-quality and comfortable sounds derived from multimedia data by means of a portable information terminal, there is such a task that not only stereo sound reproduction of comfortable sounds is required, but also broadband property in frequency of the sounds must be maintained to assure high-quality sounds with respect to portable information terminals.

Furthermore, there is such a task that maintenance of directivity in sounds is required for portable information terminal to listen the same by a plurality of persons in a restricted region, to avoid harassment with respect to surrounding people, and to be suitable for operating environment with respect to portable information terminals.

On the contrary to that described above, there is such a task that omnidirectional characteristics of sounds are to be maintained for listening such sounds by much more persons.

Besides, there is a task of requiring such convenience that two or more persons can catch individually two or more languages or sound sources.

Accordingly, the present invention has been made in view of the above-described problems and tasks. An object of the present invention is to provide a sound reproducing system in portable information terminal, which can reproduce comfortable, high-quality sounds and has high adaptability to operating environment as well as high convenience, and a method therefor.

DISCLOSURE OF THE INVENTION

In order to eliminate the above-described problems, the present invention provides a reproducing system in a portable information terminal characterized by that the portable information terminal is provided with at least two acoustic loudspeakers; and the at least two acoustic loudspeakers are driven simultaneously to compensate their reproduced sounds with each other.

According to this means, the portable information terminal can reproduce comfortable and high-quality sounds, and as a result, the portable information terminal comes to have high adaptability and high convenience with respect to operating environment.

Preferably, the above described at least two acoustic loudspeakers are either disposed on the portable information terminal in a longitudinal direction thereof, or disposed diagonally at the opposite ends of the portable information terminal.

According to this means, cross talk between acoustic loudspeakers appeared in case of reproducing stereo sounds can be avoided, so that it becomes possible to reproduce stereo sounds of high acousticity in the portable information terminal.

Preferably, one or all the members selected from the above described at least two acoustic loudspeakers is located at a certain angle with respect to a cabinet wall of the portable information terminal.

According to this means, propagating directions of sounds from at least two acoustic loudspeakers direct to a listener in the case when the portable information terminal is placed on a low place such as a desk, and a floor, so that reproduced sounds become easy to listen. Moreover, in case of a compact portable information terminal, at least two acoustic loudspeakers direct outwards to each other, whereby it is possible to avoid cross talk to be produced between the acoustic loudspeakers.

Preferably, each angle defined between one or all the acoustic loudspeakers selected from the above described at least two acoustic loudspeakers and the cabinet wall of the portable information terminal can be freely changed.

More preferably, each angle of one or all the above described at least two acoustic loudspeakers may be mutually and freely changed.

According to these means, an angle or angles of the acoustic loudspeaker(s) can be arbitrarily changed dependent upon a position of a listener with respect to the portable information terminal, and a situation of compactness of the portable information terminal.

Preferably, a cross talk barrier is placed between the above-described at least two acoustic loudspeakers, so that the cross talk barrier prevents from generating cross talk from individual acoustic loudspeakers.

According to this means, cross talk components produced in the case where the at least two acoustic loudspeakers are very close to each other are physically eliminated.

Preferably, the above-described cross talk barrier is collapsible or detachable.

According to this means, it is prevented from occurring damage of the cross talk barrier due to being hooked by any protruded member in the case where no acoustic loudspeaker is required, and the portable information terminal is carried.

Preferably, the above-described portable information terminal is provided with a signal processing circuit for eliminating cross talk; so that the signal processing circuit for eliminating cross talk processes input signals of the above-described at least two acoustic loudspeakers to eliminate cross talk.

According to this means, it becomes possible to eliminate cross talk produced between the acoustic loudspeakers without accompanying a cross talk barrier.

Preferably, at least one member selected from the above described at least two acoustic loudspeakers is located at a fallen, or recessed, place from a position of a cabinet wall of the portable information terminal.

According to this means, a protruded section towards the outside is reduced to be able to realize a cross talk barrier being less protrusive.

Preferably, either a part or the whole of the above-described at least one acoustic loudspeaker is covered with a perforated section of a cabinet wall of the portable information terminal, or a cabinet wall covering a vibrating surface of the loudspeaker is removed.

According to this means, it is possible to elevate a sound pressure of sounds from loudspeakers.

Preferably, at least one acoustic loudspeaker is protruded from a side of opposite ends of the portable information terminal.

According to this means, a distance between the acoustic loudspeakers is broadened, so that cross talk can be reduced, whereby it becomes possible to reproduce stereo sounds of high acousticity without employing a cross talk barrier.

Preferably, the above-described at least one acoustic loudspeaker is located at a deeper position from the front of the portable information terminal; and either a part of the above-described at least one acoustic loudspeaker is covered with a perforated section of a cabinet wall of the portable information terminal, or a cabinet wall covering a vibrating surface of the at least one acoustic loudspeaker is removed.

According to this means, a distance between the acoustic loudspeakers is broadened, so that cross talk can be reduced, whereby it becomes possible to reproduce stereo sounds of high acousticity, besides it is possible to increase a sound pressure of the acoustic loudspeakers without employing a cross talk barrier.

Preferably, the above described at least one protruded acoustic loudspeaker is contained inside the portable information terminal.

According to this means, the protruded acoustic loudspeaker is contained inside the portable information terminal in case of carrying the same, so that a trouble of being hooked by anything can be avoided in case of portage.

Preferably, the above described at least two acoustic loudspeakers are arranged in a row of a speaker array in the portable information terminal.

According to this means, since directivity is improved in a direction of the speaker array, it is possible to arrange in such that sounds are delivered only to a small number of listeners, but not to the third party, so that listening of sounds in which harassment with respect to a surrounding area can be avoided without employing headphone and the like in the case where sounds are listened by a small number of the listeners in a place such as coffee house by means of the present portable information terminal 1.

Preferably, the above described at least two acoustic loudspeakers are arranged in the portable information terminal so as to direct different directions from one another.

According to this means, since the acoustic loudspeakers can be set outwards to each other, cross talk in sounds of the acoustic loudspeakers decreases, so that reproduction of stereo sounds of high acousticity can be realized. Moreover, when acoustic loudspeakers are disposed towards every sides of the portable information terminal, higher effect of omnidirection can be achieved, and this is convenient in case of making a number of listeners to listen sounds.

Preferably, the above described at least two acoustic loudspeakers reproduce sounds in such that different sounds are listened individually in different directions.

According to this means, it becomes possible that, for example, voices of two different languages are listened by a plurality of persons, and a plurality of languages is listened at the same time as individually different sounds by the use of a single portable information terminal 1.

Preferably, the above-described portable information terminal is provided with a signal processing circuit for converging directivity; and the signal processing circuit for converging directivity processes input signals of the above-described at least two acoustic loudspeakers to converge directions of directivity.

According to this means, directivity of acoustic sound propagation is converged in a certain direction as a result of signal processing by means of a small number of acoustic loudspeakers.

Preferably, the portable information terminal is provided with an omnidirectional signal processing circuit; and the omnidirectional signal processing circuit processes input signals of the above-described at least two acoustic loudspeakers to make them omnidirectional.

According to this means, omnidirection wherein acoustic sound propagation expands more widely by means of a small number of acoustic loudspeakers is realized, whereby it becomes possible to listen sounds by a number of listeners with the use of a single portable information terminal without increasing acoustic loudspeakers.

Preferably, the portable information terminal is provided with a signal processing circuit for converging directions of the above-described at least two acoustic loudspeakers with respect to their directivities and an omnidirectional signal processing circuit for making the above-described at least two acoustic loudspeakers omnidirectional; and the signal processing circuit for converging directivity and the omnidirectional signal processing circuit are selected alternatively.

According to this means, since signal processing functions are made to be selectable, it becomes possible to implement the optimum signal processing, besides it becomes possible to listen always comfortable sounds.

Preferably, the above described at least two acoustic loudspeakers having high efficiency are used, whereby it becomes possible to drive the above described at least two acoustic loudspeakers in case of reproducing sounds without employing any amplifier.

According to this means, acoustic loudspeakers having high efficiency are used to operate the same without employing any amplifier. Thus, since no amplifier is required as described above, the number of parts to be used in a portable information terminal decreases, a compact and light-weight portable information terminal can be realized, and low power consumption can be realized, so that an available time by a single charge increases in the portable information terminal.

Preferably, individual sounds are reproduced from the above described at least two acoustic loudspeakers; and sound volumes of the individual sounds can be uniquely adjusted.

According to this means, when a foreign language is learned, for example, while listening two languages including native language, learning efficiency can be elevated by listening the foreign language with a larger sound volume than that of the native language.

Preferably, the above described at least two acoustic loudspeakers have characteristics specialized to middle- to high-pitched tone ranges, and that specialized to a low-pitched tone range, respectively.

According to this means, it becomes possible to reproduce sounds of higher acousticity in a high bandwidth.

Preferably, the above-described at least two acoustic loudspeakers are arranged in such that when the portable information terminal is placed to be in contact with a plane including a desk, a floor, and a wall surface, the above-described at least two acoustic loudspeakers can utilize reflection of sounds.

According to this means, it becomes possible that when the portable information terminal 1 is in contact with a plane of desk or the like, low note components are reflected by the plane of desk to reverse a phase thereof, so that the low note components come to have the same phase as that come out from the front of the acoustic loudspeakers, whereby the low note components coming out frontward can be reinforced.

Preferably, the above described at least two acoustic loudspeakers can reproduce sounds simultaneously with a communication by means of the portable information terminal. More preferably, acoustic sound reproducing signals of the above described at least two acoustic loudspeakers are transmitted so as to be able to listen also by the other party for communication.

According to this means, it becomes possible to realize a conversation accompanied with BGM by the use of the portable information terminal.

Preferably, at least one member selected from the above-described at least two acoustic loudspeakers is the one serving both as a acoustic loudspeaker and a device of the portable information terminal including an acoustic loudspeaker serving also as a speaking microphone, an acoustic loudspeaker serving also as a receiving speaker, an acoustic loudspeaker serving also as a ringer, an acoustic loudspeaker serving also as a vibrator, an acoustic loudspeaker serving also as a screen display monitor, and an acoustic loudspeaker serving also as a key panel.

According to this means, since an acoustic loudspeaker serves also as a device, the number of parts to be used in the portable information terminal decreases, whereby downsizing and weight reduction of the portable information terminal can be achieved.

Preferably, an acoustic signal generator is connected to the above-described portable information terminal; the acoustic signal generator stores acoustic sound data; and the above-described at least two acoustic loudspeakers reproduce sounds based on the acoustic sound data obtained from the acoustic signal generator.

According to this means, when the portable information terminal is allowed to function as an external acoustic loudspeaker and adding a function for reproducing sounds from other sound source, the portable information terminal becomes possible to respond much more sound data, and in addition, it becomes unnecessary for carrying separately any acoustic loudspeaker other than the portable information terminal.

Preferably, a plurality of the above-described acoustic signal generators is connected to the portable information terminal; and any of the acoustic signal generators from which data is to be acquired is changed over by a switch.

According to this means, for example, sounds derived from a plurality of sound sources can be easily compared with each other, whereby convenience can be elevated.

Preferably, the above-described at least two acoustic loudspeakers are allowed to be able to reproduce sounds without employing any amplifier; and they are made to be able to reproduce sounds of the acoustic sound data obtained from the above-described acoustic signal generator in a condition where a power supply in the portable information terminal itself has been shut off.

According to this means, it becomes possible to reproduce sounds under a condition where a power supply is shut off in a portable information terminal itself in case of reproducing input signals from the outside. As a result, electricity for the portable information terminal is saved to increase a serviceable time for a single charge, whereby it becomes possible to reproduce sounds of high acousticity irrespective of a remaining amount of battery.

Preferably, the above-described portable information terminal acquires data from the above-described acoustic signal generator through radio wave.

For this means, a means such as BLUETOOTH™ wireless technology is applicable, so that no cable is required, whereby a constitution of system can be simplified.

Preferably, a headphone or an earphone is connected to the portable information terminal; and reproduced sounds are listened by means of the headphone or earphone in place of the above described at least two acoustic loudspeakers.

More preferably, reproduced sounds from the above described at least two acoustic loudspeakers are listened simultaneously with a communication message in the portable information terminal by means of the above-described headphone or earphone.

According to these means, no remarkable harassment arises with respect to a surrounding area, and communication accompanied with comfortable BGM can be realized through telephone conversation. Furthermore, when any of sounds of noise in station, hustle and bustle, pink gin in department store, lush house and the like is selected as a background effect, more pleasant communication can be promoted.

Preferably, the above-described portable information terminal is extensible, and more preferably, the above-described portable information terminal is collapsible.

According to these means, the present invention is also applicable for an extensible or collapsible type portable information terminal, besides reproduction of stereo sounds of high acousticity is possible.

Furthermore, a method for reproducing sounds in a portable information terminal according to the present invention is characterized by that at least two acoustic loudspeakers disposed in the portable information terminal are driven at the same time to compensate reproduced sounds with each other.

According to this means, a portable information terminal can reproduce comfortable and high-quality sounds as in the above-mentioned invention, whereby the portable information terminal became to have high adaptability and high convenience with respect to operating environment.

THE BEST MODE FOR EXECUTING THE INVENTION

In the following, embodiments of the present invention will be described by referring to the accompanying drawings.

Figure 1:
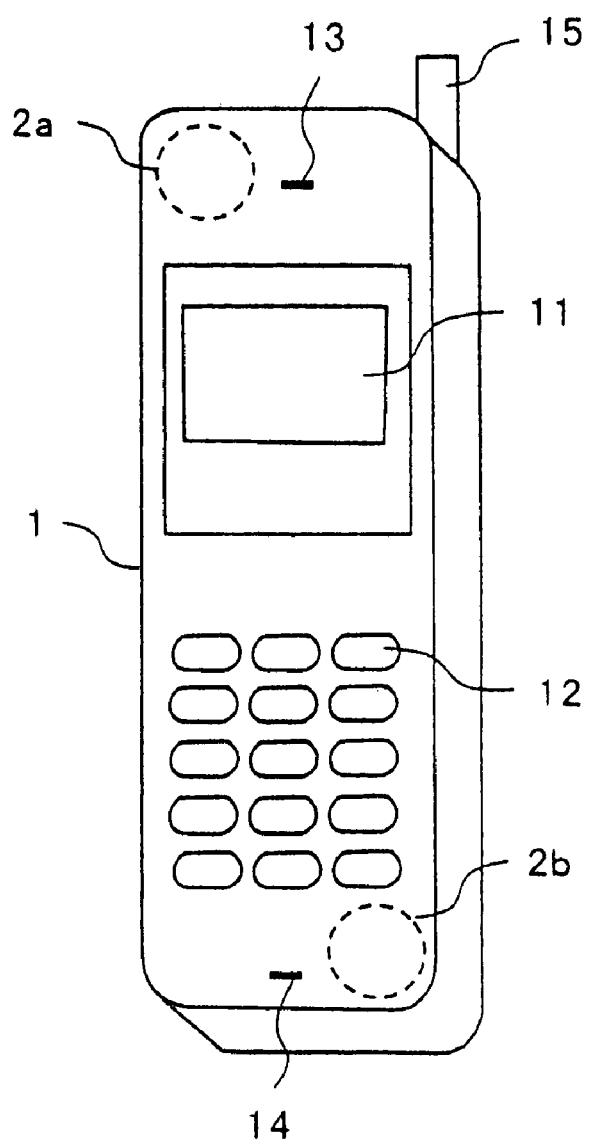
FIG. 1 is a view showing a schematic structure of a first embodiment of a sound reproducing system in a portable information terminal according to the present invention.

FIG. 1 is a view showing a schematic structure of a first embodiment of a sound reproducing system in a portable information terminal according to the present invention.

As shown in the present figure, a portable information terminal 1 is composed of a screen display monitor 11 made of liquid crystal (LCD) for displaying menus, telephone numbers, functions and the like, a key panel 12 for selecting a menu, input operation of a telephone number to be operated, selecting operation of a function and the like operation, an ear piece 13 for hearing received voice through a loudspeaker, a mouthpiece 14 for delivering voice to be transmitted to a microphone, an antenna 15 for transforming received radio waves into received signals, while transforming transmission signals into transmission radio waves, and the like components.

Furthermore, the portable information terminal 1 is provided with acoustic loudspeakers 2a and 2b for reproducing stereo sounds.

The acoustic loudspeakers 2a and 2b are disposed diagonally on the front of the portable information terminal 1 at the opposite ends thereof along the longitudinal direction of the portable information terminal. These acoustic loudspeakers 2a and 2b are directed to a frontward direction of the portable information terminal 1 in such that a distance defined between the acoustic loudspeakers 2a and 2b becomes the maximum.

Figure 2:
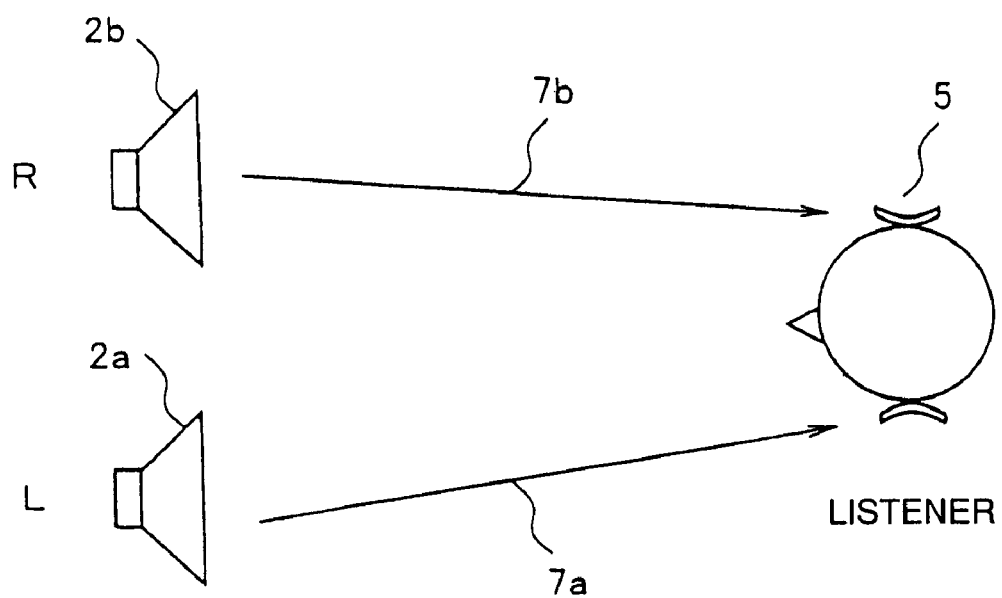
FIG. 2 is a view for explaining stereo sound reproduction by means of acoustic loudspeakers 2a and 2b of FIG. 1.

FIG. 2 is a diagram for explaining stereo sound reproduction of the acoustic loudspeakers 2a and 2b of FIG. 1.

As shown in the present figure, left (L) and right (R) signals are reproduced stereophonically by means of the acoustic loudspeakers 2a and 2b, and sounds thus reproduced stereophonically are delivered to a listener.

According to the above-described arrangement, it becomes possible to reproduce sounds of comfortable and high acousticity by means of the acoustic loudspeakers 2a and 2b. Namely, unlike the prior art, reproduction of stereo sounds can be made by the use of only the portable information terminal 1 without accompanying headphone, earphone, external speaker system and the like.

In a first modified example of the first embodiment, a portable information terminal 1 is constituted in such that both backsides of the acoustic loudspeakers 2a and 2b are disengaged in the case when the portable information terminal 1 is disposed on a plane of desk, floor, by the wall or the like being in contact therewith, whereby reflection of sounds can be utilized.

Since the portable information terminal 1 is compact, reproduction of low notes is difficult. According to the present invention, it becomes possible that when the portable information terminal 1 is in contact with a plane of desk or the like, low note components are reflected by the plane of desk to reverse a phase thereof, so that the low note components come to have the same phase as that come out from the front of the acoustic loudspeakers 2a and 2b, whereby the low note components coming out frontward can be reinforced.

In the case where the portable information terminal 1 is not in contact with a plane of desk or the like, backsides of the acoustic loudspeakers 2a and 2b are closed so as not to decrease sound pressure of low note components as a result of getting the low note components into the front of the acoustic sound speakers 2a and 2b due to diffraction effects.

In a second modified example of the first embodiment, acoustic loudspeakers 2a and 2b having high efficiency are used to operate the same without employing any amplifier. Thus, since no amplifier is required as described above, the number of parts to be used in a portable information terminal 1 decreases, a compact and light-weight portable information terminal can be realized, and low power consumption can be realized, so that an available time by a single charge increases in the portable information terminal 1.

In a third modified example of the first embodiment, it is constituted in such that sounds can be reproduced at the same time of phone call. In this case, acoustic sound reproducing signals are transmitted in such a manner that they can be listened also by the other party during the phone call, whereby communication accompanied with BGM becomes possible.

In a fourth modified example of the first embodiment, it is constituted in such that individual sounds are reproduced by means of acoustic loudspeakers 2a and 2b, respectively, and each sound volume of individual sounds can be individually adjusted. Hence, when a foreign language is learned, for example, while listening two languages including native language, learning efficiency can be elevated by listening a larger sound volume of the foreign language than that of the native language.

Figure 3:
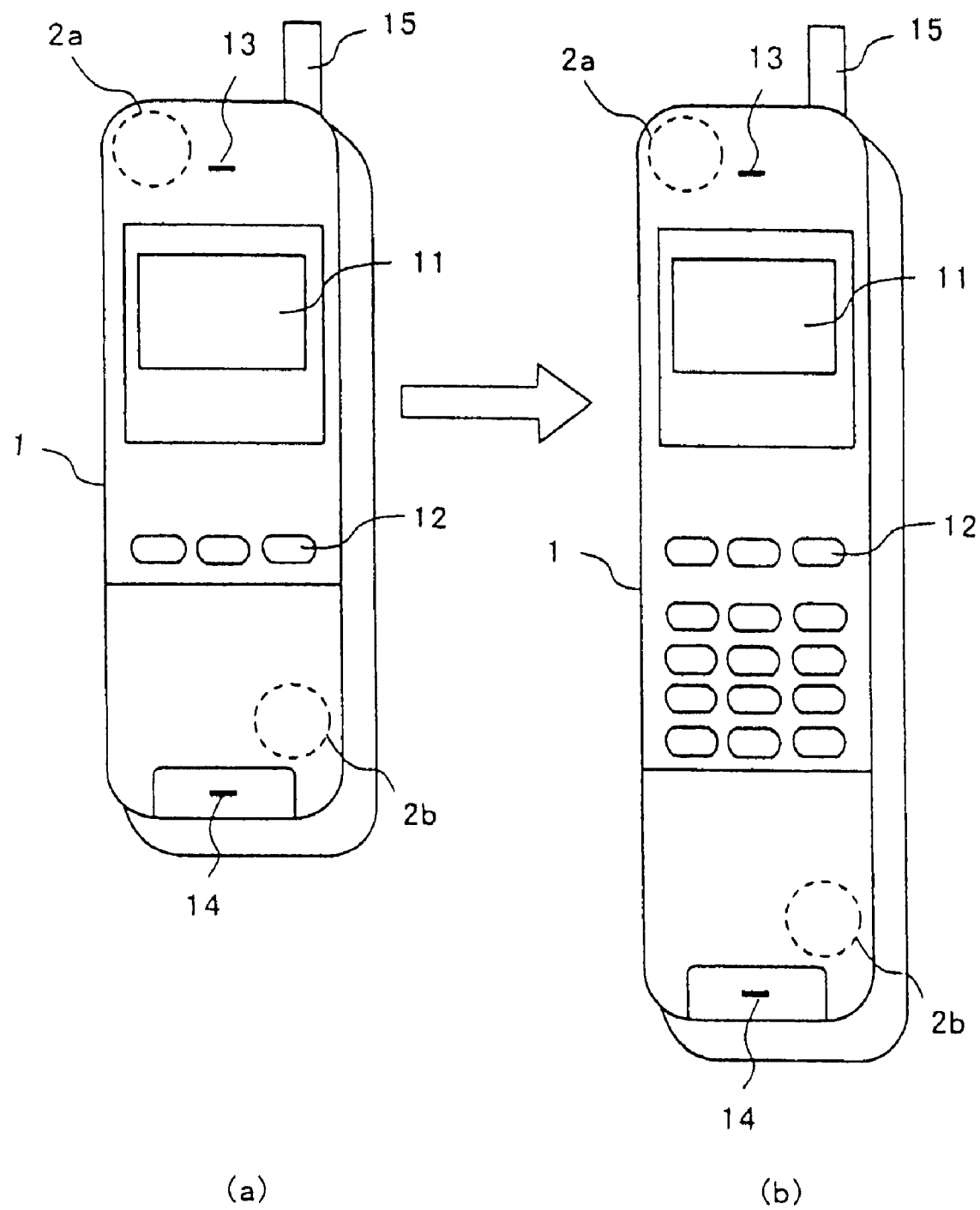
FIGS. 3(a) and 3(b) are views each showing a schematic structure of a second embodiment of a sound reproducing system in a portable information terminal according to the present invention.

FIGS. 3(a) and 3(b) are views each showing a schematic structure of a second embodiment of a sound reproducing system in a portable information terminal according to the present invention.

As shown in the present figure, a portable information terminal 1 is an extensible type in comparison with the portable information terminal of FIG. 1.

Acoustic sound loudspeakers 2a and 2b are disposed diagonally on the front of the portable information terminal 1 at the opposite ends thereof along the longitudinal direction of the portable information terminal.

As shown in FIGS. 3(a) and 3(b), when a flip section of the portable information terminal 1 is extended to broaden a distance between the acoustic loudspeakers 2a and 2b, and as a result, the distance between the acoustic loudspeakers 2a and 2b becomes the maximum, whereby cross talk in the acoustic loudspeakers 2a and 2b decreases.

Since the present invention has been applied to the extensible portable information terminal, it becomes possible to provide stereo sound reproduction of high acousticity in addition to convenience of portage therefor in case of transfer.

Figure 4:
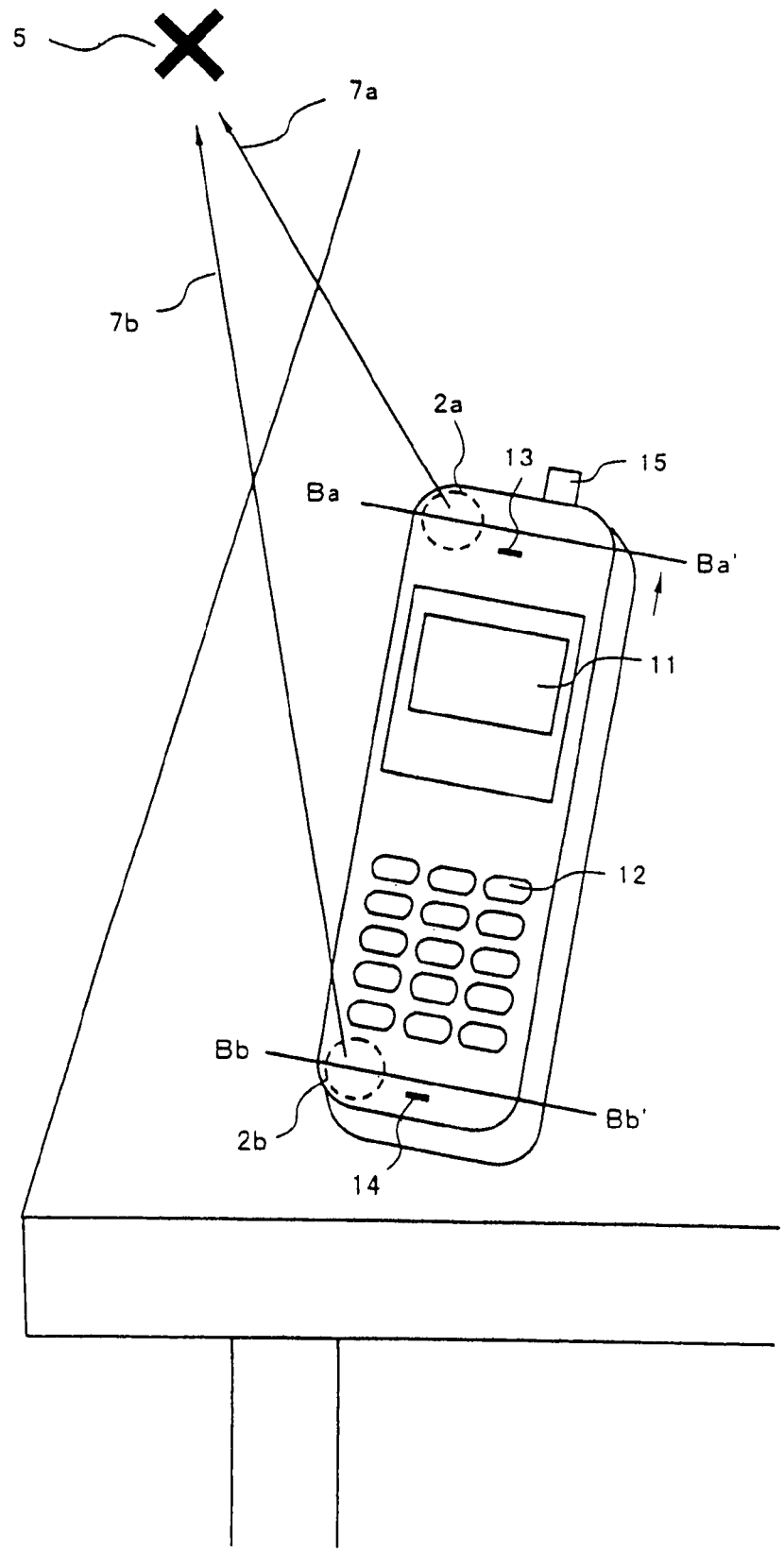
FIG. 4 is a view showing a schematic structure of a third embodiment of a sound reproducing system in a portable information terminal according to the present invention.

FIG. 4 is a view showing a schematic structure of a third embodiment of a sound reproducing system in a portable information terminal according to the present invention.

As shown in the present figure, acoustic loudspeakers 2a and 2b are disposed on the front of the portable information terminal 1 at the opposite ends in the same side thereof along the longitudinal direction of the portable information terminal in comparison with the portable information terminal of FIG. 1, whereby it is arranged in such that a distance between the acoustic loudspeakers 2a and 2b becomes the maximum.

With respect to the present portable information terminal 1, it is supposed that the portable information terminal 1 is located on a plane of desk, floor or the like where is a lower position than that of ears of a listener, so that the acoustic loudspeakers 2a and 2b are arranged as described hereunder.

Figure 5:
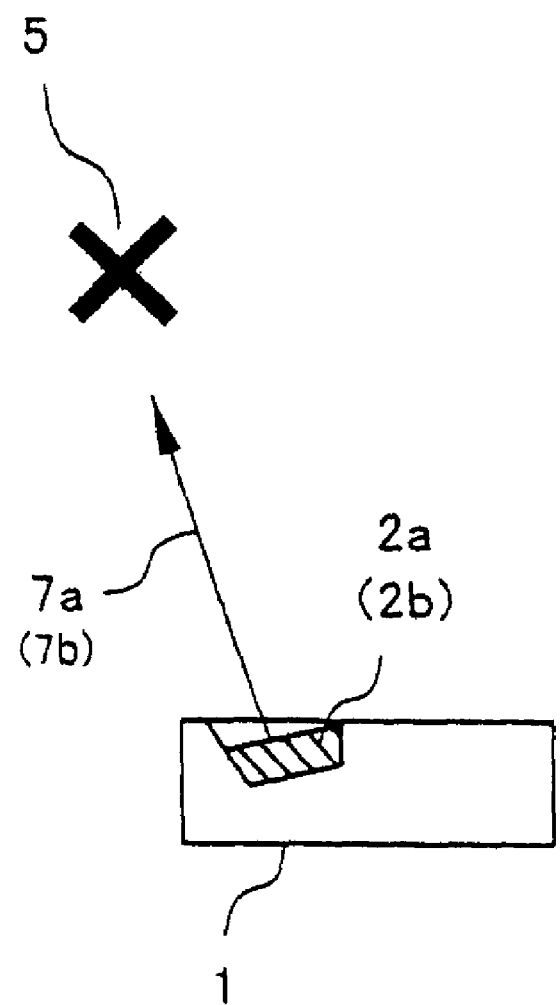
FIG. 5 is a sectional view taken along the line either Ba-Ba' or Bb-Bb' of FIG. 4.

FIG. 5 is a sectional view taken along either the line Ba-Ba' or the line Bb-Bb' of FIG. 4. As shown in the present figure, each of the acoustic loudspeakers 2a and 2b is disposed at a certain angle with respect to a cabinet wall of the portable information terminal 1 wherein the acoustic loudspeakers 2a and 2b are to be located, respectively, so that sounds from both the acoustic loudspeakers 2a and 2b reach a position 5 of the listener along a direction 7 of propagation of sounds.

It is to be understood that an angle defined between either of the acoustic loudspeakers 2a and 2b and a corresponding cabinet wall as well as an angle defined between the acoustic loudspeakers 2a and 2b may be freely altered.

As mentioned above, when each direction of the acoustic loudspeakers 2a and 2b is directed to a position of the listener, sounds, which can be more easily listen by the listener, can be realized.

Figure 6:
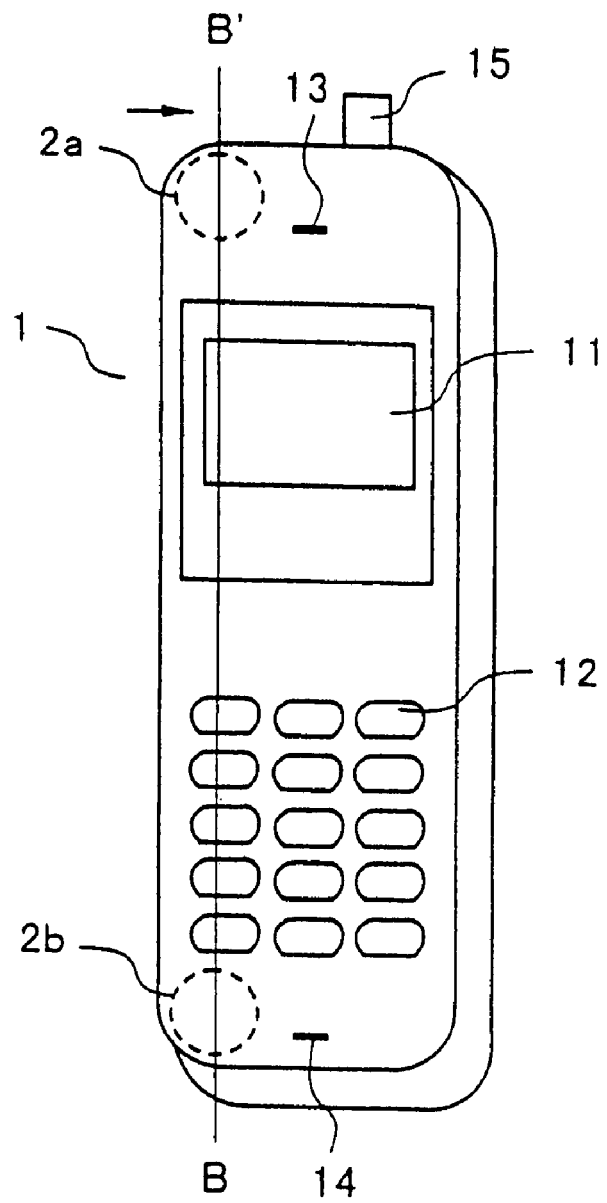
FIG. 6 is a view showing a schematic structure of a fourth embodiment of a sound reproducing system in a portable information terminal according to the present invention.
Figure 7:
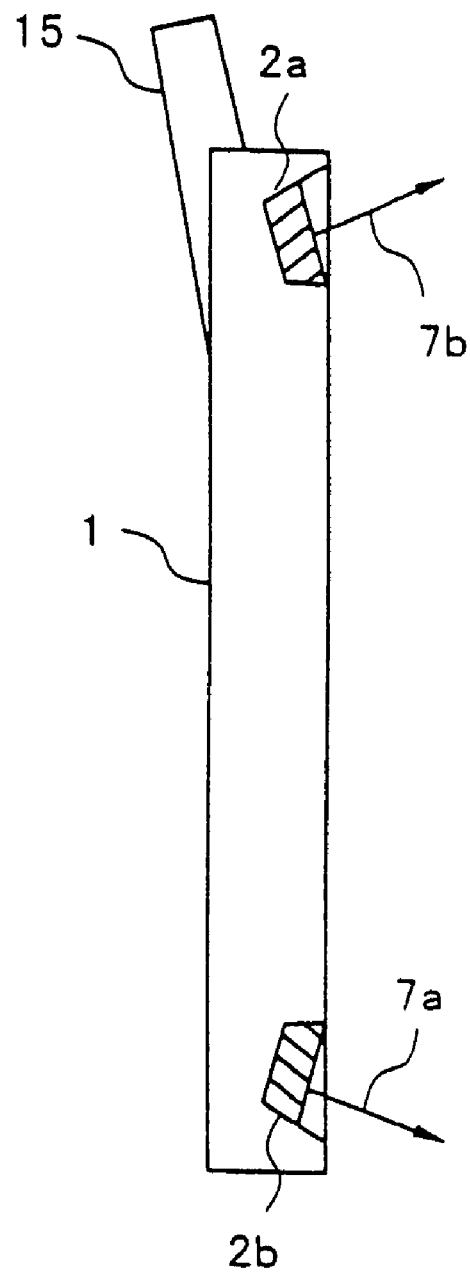
FIG. 7 is a sectional view taken along the line B-B' of FIG. 6.

FIG. 6 is a view showing a schematic structure of a fourth embodiment of a sound reproducing system in a portable information terminal according to the present invention, and FIG. 7 is a sectional view taken along the line B-B' of FIG. 6.

As shown in FIG. 6, when compared with FIG. 4, although acoustic loudspeakers 2a and 2b are disposed on the front of the portable information terminal 1 at the opposite ends in the same side thereof along the longitudinal direction of the portable information terminal as in the case of FIG. 4, the acoustic loudspeakers 2a and 2b are disposed outwards to each other as shown in FIG. 7.

In this case, it is to be understood that the outward angles with respect to both the acoustic loudspeakers 2a and 2b may be freely changed.

It is supposed herein that further downsizing of the portable information terminal 1 results in a narrower distance between the acoustic loudspeakers 2a and 2b. As a result, cross talk increases between the acoustic loudspeakers 2a and 2b, so that stereophonic effects disappear. However, when the acoustic loudspeakers 2a and 2b are located outwards, respectively, as shown in FIG. 6, the cross talk decreases as described hereinafter.

FIGS. 8(a) and 8(b) are diagrams each explaining for decrease in cross talk of acoustic loudspeakers 2a and 2b shown in FIGS. 6 and 7.

In case of FIG. 8(a), acoustic loudspeakers 2a and 2b are disposed in the same direction with respect to a listener. In this case, a propagating direction 7a of sounds from the acoustic loudspeaker 2a is composed of a propagating direction 7aL towards a left ear of the listener and a propagating direction 7aR towards a listener's right ear as cross talk (dotted line), while a propagating direction 7b of sounds from the acoustic loudspeaker 2b is composed of a propagating direction 7bL towards a listener's left ear as cross talk (dotted line) and a propagating direction 7bR towards a listener's right ear.

There is no cross talk unlike the above-described situation when headphone or earphone is used, because sounds do not propagate in space.

When a distance between the acoustic loudspeakers 2a and 2b is maintained at more than a certain distance, a sound pressure and a phase difference produced in both ears of a listener, respectively, from sounds in the propagating directions 7aL and 7aR as well as sounds in the propagating directions 7bR and 7bL, which are delivered from the acoustic loudspeakers 2a and 2b, are extensive, and further, polarities thereof are mutually inverse, so that sound sources produced by the acoustic loudspeakers 2a and 2b are discriminated.

In this respect, however, when the acoustic loudspeakers 2a and 2b approach to each other, sounds in the propagating directions 7bR and 7aR reach the listener's right ear, while sounds in the propagating directions 7aL and 7bL reach the listener's left ear in a situation wherein a sound pressure and a phase difference produced in both the ears of the listener based on acoustic waves transmitted from the acoustic loudspeakers 2a and 2b are small. Thus, stereo sound effects disappear, and only monaural effects are obtained.

As shown in FIG. 8(b), when the acoustic loudspeakers 2a and 2b are disposed outwards with respect to each other, a ratio of sounds, which are those in the propagating direction 7aR towards a listener's right ear from the acoustic loudspeaker 2a do not reach the listener's right ear, as well as a ratio of sounds, which are those in the propagating direction 7bL towards a listener's left ear from the acoustic loudspeaker 2b do not reach the listener's left ear, increase, so that cross talk decreases.

Because of such decrease in cross talk, a ratio of sounds, which reach the listener's right ear from the acoustic loudspeaker 2b, as well as a ratio of sounds, which reach the listener's left ear from the acoustic loudspeaker 2a, increase.

For this reason, the listener can discriminate sound sources of the acoustic loudspeakers 2a from that of the acoustic loudspeakers 2b, so that it becomes possible to obtain stereo sound effects as in the case of headphone or earphone, even if a distance between the acoustic loudspeakers 2a and 2b becomes narrow.

Figure 9:
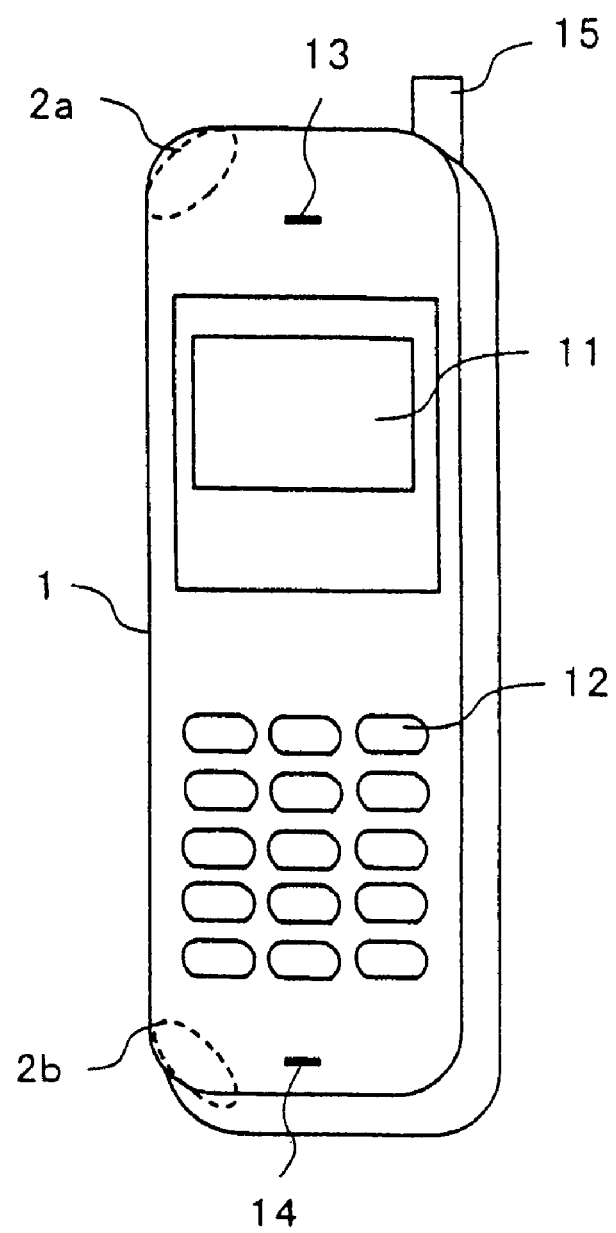
FIG. 9 is a view showing a schematic structure of a fifth embodiment of a sound reproducing system in a portable information terminal according to the present invention.

FIG. 9 is a view showing a schematic structure of a fifth embodiment of a sound reproducing system in a portable information terminal according to the present invention.

As shown in the present figure, in comparison with FIG. 1, an acoustic loudspeaker 2a is disposed on the front of a portable information terminal 1 in such a manner that the loudspeaker 2a extends to the left side of the portable information terminal viewed from the top and the front thereof, while the acoustic loudspeaker 2b is disposed on the front of the portable information terminal 1 in such a manner that the loudspeaker 2b extends to the left side of the portable information terminal viewed from the bottom and the front thereof.

Figure 8:
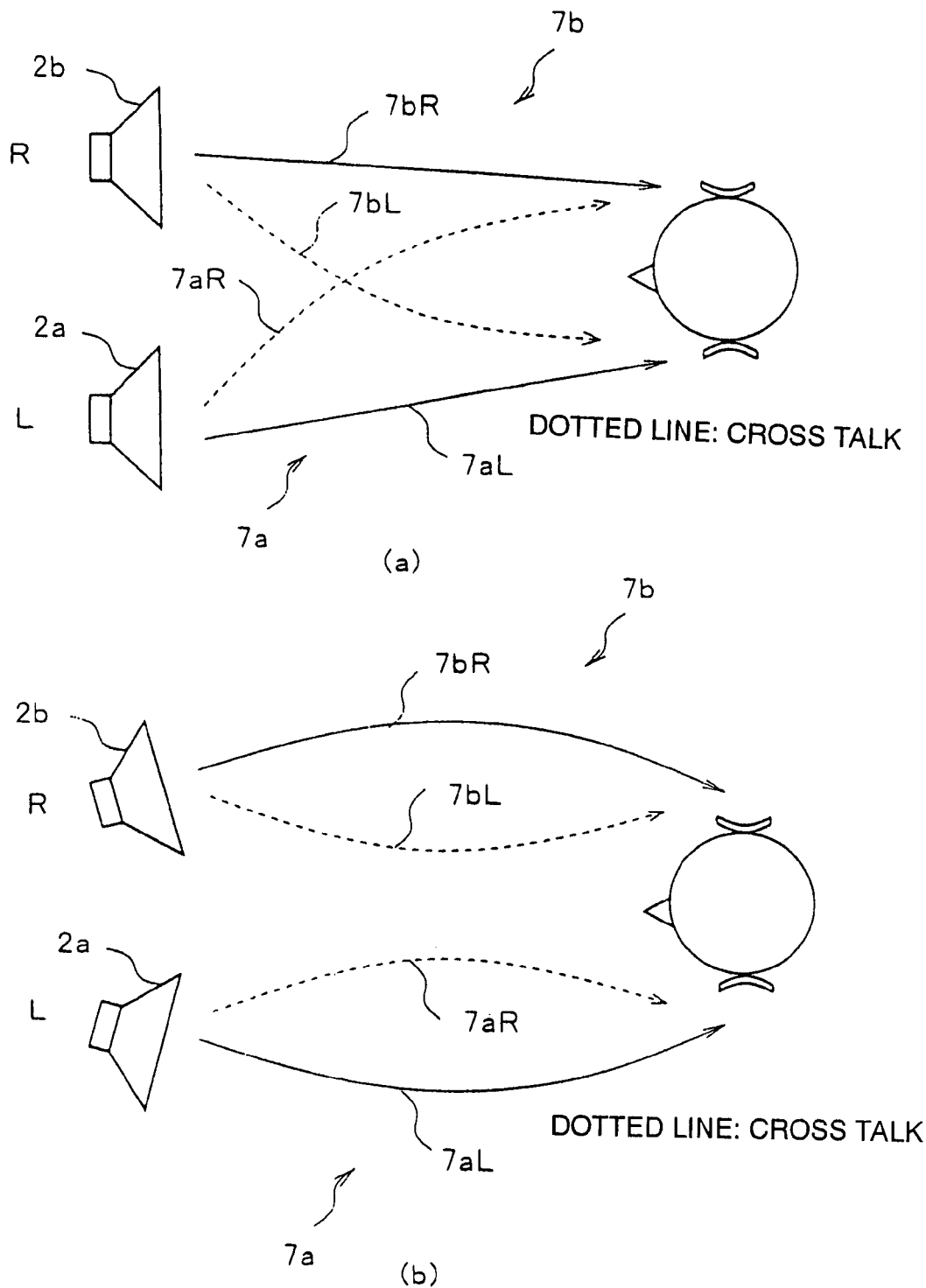
FIGS. 8(a) and 8(b) are diagrams each explaining for decrease in cross talk of acoustic loudspeakers 2a and 2b shown in FIGS. 6 and 7.

According to the present invention, it is constituted in such that propagating directions of sounds from acoustic loudspeakers 2a and 2b are directed to a listener in a situation wherein a portable information terminal 1 is located on a plane of desk, floor or the like, which is positioned at a lower position than ears of the listener as shown in FIG. 4 in addition to stereo sound reproduction of high acousticity derived from effects of decrease in cross talk as described in FIGS. 7 and 8. As a result, sounds can be more easily listened based on the above-described constitution.

Figure 10:
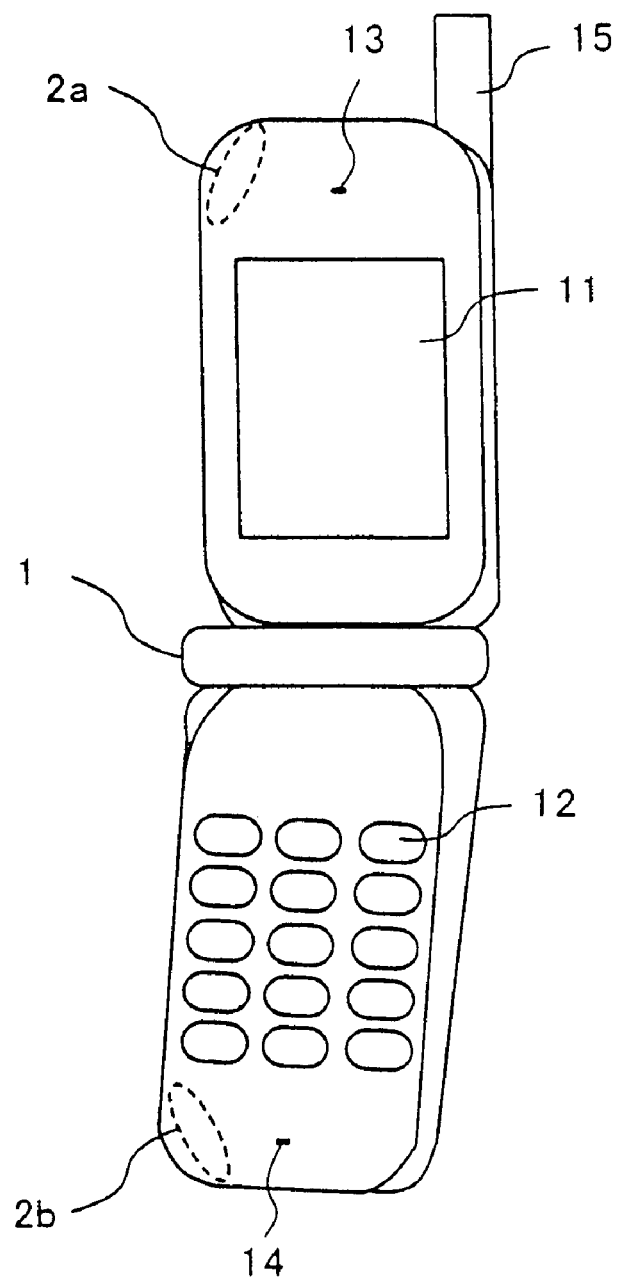
FIG. 10 is a view showing a schematic structure of a sixth embodiment of a sound reproducing system in a portable information terminal according to the present invention.

FIG. 10 is a view showing a schematic structure of a sixth embodiment of a sound reproducing system in a portable information terminal according to the present invention.

As shown in the present figure, in comparison with FIG. 1, a portable information terminal 1 is a foldaway type wherein an acoustic loudspeaker 2a is disposed on the front of a portable information terminal 1 in such a manner that the loudspeaker 2a extends to the left side of the portable information terminal viewed from the top and the front thereof, while the acoustic loudspeaker 2b is disposed on the front of the portable information terminal 1 in such a manner that the loudspeaker 2b extends to the left side of the portable information terminal viewed from the bottom and the front thereof.

As compared with an example shown in FIG. 9, the present invention has been applied to the foldaway portable information terminal 1 in the sixth embodiment, so that it becomes possible to provide stereo sound reproduction of high acousticity in addition to convenience of portage in case of transfer.

Although it is desired that a distance defined between both acoustic loudspeakers is broad, dimensions of a distance between individual acoustic loudspeakers and the like are self-limited due to a size of the portable information terminal 1, a configuration of other parts in such portable information terminal aiming to downsize and reduce its weight. A further explanation will be made as to the case as described herein.

Figure 11:
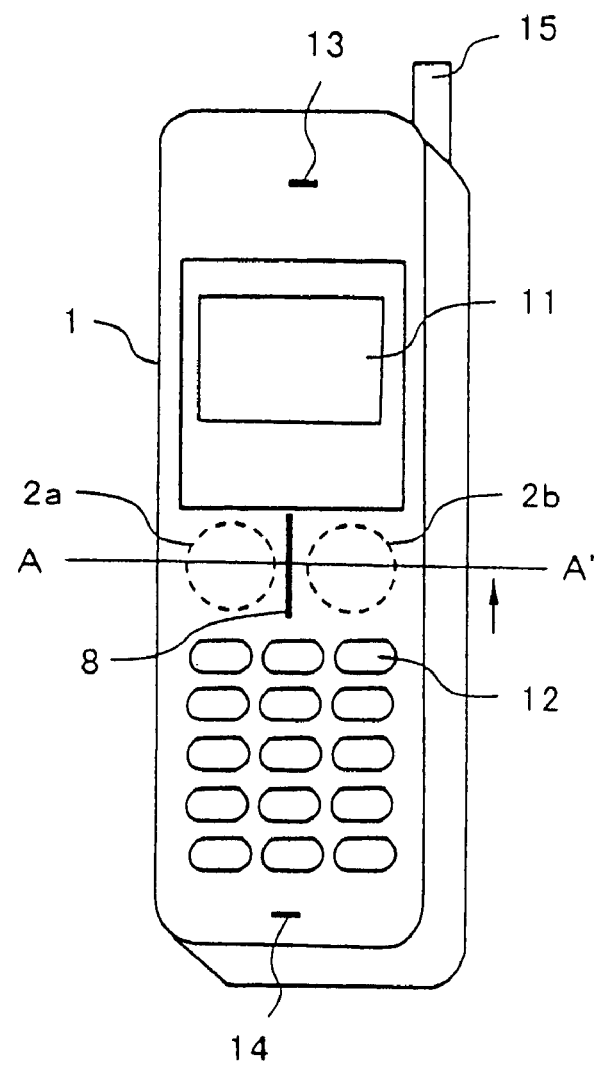
FIG. 11 is a view showing a schematic structure of a seventh embodiment of a sound reproducing system in a portable information terminal according to the present invention.
Figure 12:
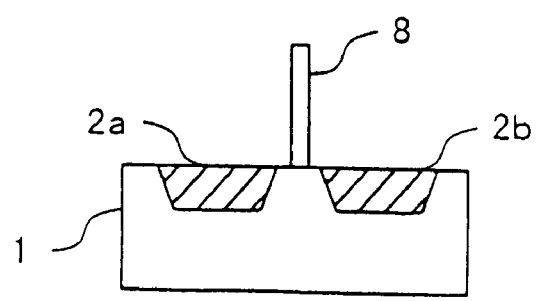
FIG. 12 is a schematic constitutional view of A-A' section involving acoustic loudspeakers 2a and 2b in FIG. 11 viewed from a direction of the arrow.

FIG. 11 is a view showing a schematic structure of a seventh embodiment of a sound reproducing system in a portable information terminal according to the present invention, and FIG. 12 is a schematic constitutional view of A-A' section involving acoustic loudspeakers 2a and 2b in FIG. 11 viewed from a direction of the arrow.

As shown in the present figure, in comparison with FIG. 1, acoustic loudspeakers 2a and 2b are disposed on the front of a portable information terminal 1 in such that both surfaces of the acoustic loudspeakers 2a and 2b coincide with a surface of the portable information terminal 1, these loudspeakers 2a and 2b are aligned horizontally, they are located to be directed frontwards with respect to the portable information terminal 1, and they are positioned between a screen display monitor 11 and a key panel 12.

A cross talk barrier 8 is disposed between the acoustic loudspeakers 2a and 2b, and the cross talk barrier 8 is a wall, which projects outside surfaces of the acoustic loudspeakers 2a and 2b. The cross talk barrier 1 reduces cross talk appearing between the acoustic loudspeakers 2a and 2b in the case where both the acoustic loudspeakers 2a and 2b are positioned to be close to each other as described above, whereby stereo sound reproduction of high acousticity is realized.

Figure 13:
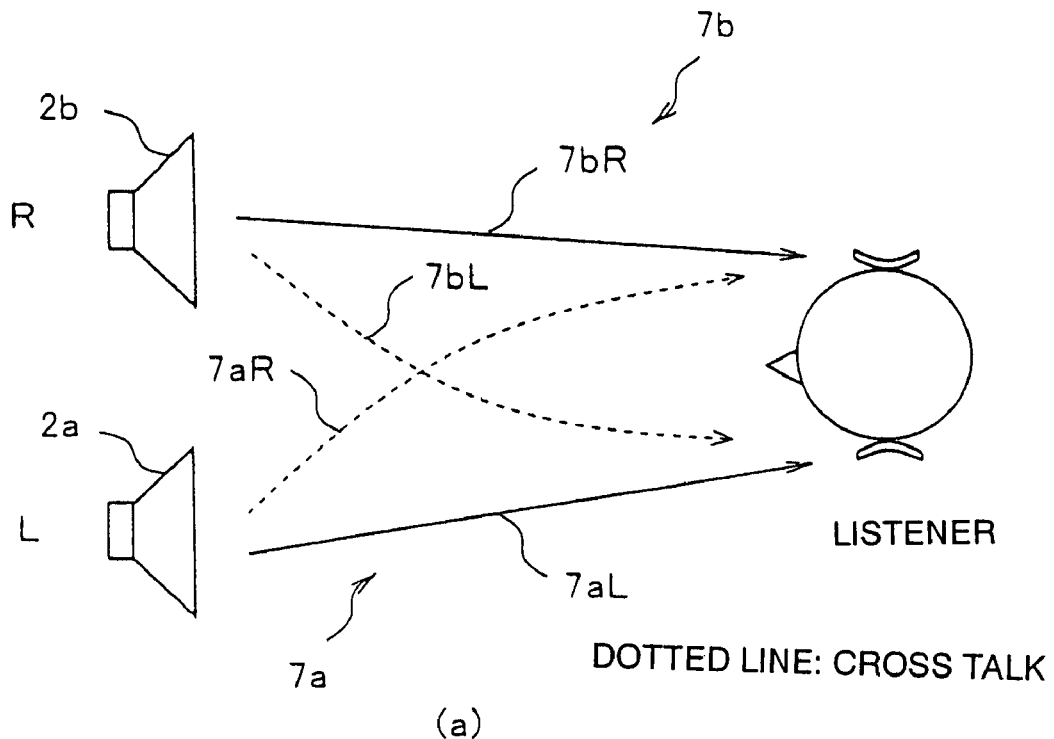
FIGS. 13(a) and 13(b) are diagrams each explaining for decrease in cross talk of acoustic loudspeakers 2a and 2b shown in FIGS. 11 and 12.
Figure 13:
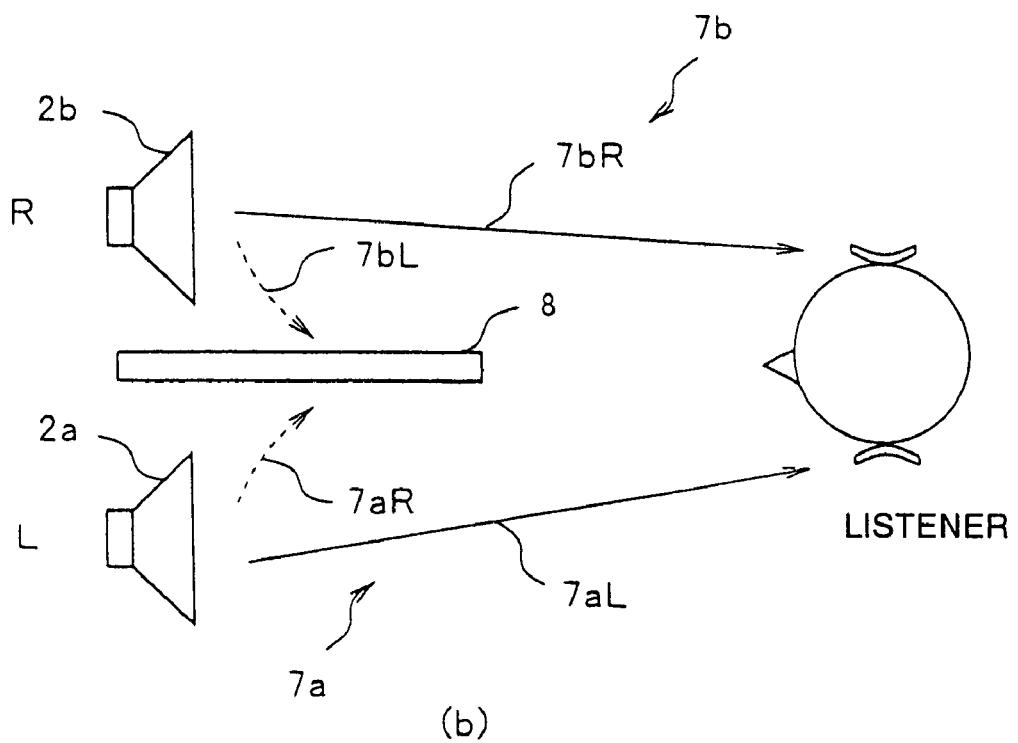

FIGS. 13(a) and 13(b) are diagrams each explaining for decrease in cross talk of acoustic loudspeakers 2a and 2b shown in FIGS. 11 and 12.

As shown in FIG. 13(b), cross talk 7aR, 7bL between the acoustic loudspeakers 2a and 2b is physically blocked off by means of the cross talk barrier 8, so that the cross talk does not reach both left and right ears of a listener. As a result, it becomes possible to realize stereo sound reproduction of high acousticity.

Since the cross talk barrier 8 protrudes from the portable information terminal 1, there is a possibility of arising a trouble of being hooked by something in case of moving the portable information terminal 1. In this respect, it is constituted in such that the cross talk barrier 8 is made to be transferable, for example, it may be folded, or it may be removed in case of nonuse, while the cross talk barrier 8 is to be set in only the case where sounds are to be listened in a first modified example in the seventh embodiment of the present invention.

According to the arrangement as described above, there is no trouble of damage or the like in case of transfer of the portable information terminal, while it becomes possible to reproduce stereo sounds of high acousticity in case of listening sounds.

It may be constituted that a length of the cross talk barrier 8 extends in a vertical direction of the portable information terminal shown in FIG. 11. When the cross talk barrier 8 is short in a vertical direction of the portable information terminal, cross talk can be avoided where the barrier exists, but a factor for cross talk appears at a position where no barrier exists. In this respect, however, when the cross talk barrier 8 is extended in a vertical direction, it becomes possible to decrease further cross talk.

Furthermore, when it is constituted in such that a storage space for the cross talk barrier 8 is defined in the portable information terminal 1, and the cross talk barrier 8 disengaged is contained in the storage space, it becomes possible to avoid missing for the cross talk barrier 8.

Figure 14:
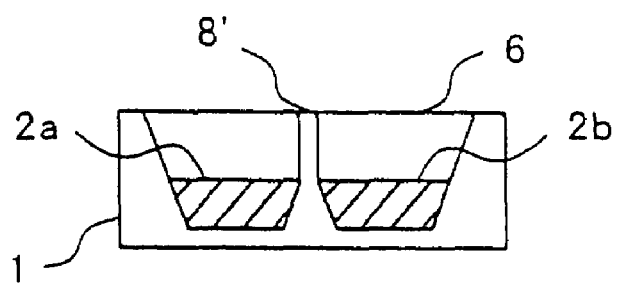
FIG. 14 is a diagram showing a second modified example of a schematic structure of the seventh embodiment in FIG. 11.

FIG. 14 is a diagram showing a second modified example of a schematic structure of the seventh embodiment in FIG. 11.

As shown in the present figure, acoustic loudspeakers 2a and 2b are disposed at more fallen, or recessed, positions than a position of cabinet wall 6 of a portable information terminal 1 in a constitution in a section corresponding to the line A-A' of FIG. 11, and the acoustic loudspeaker 2a is separated from the acoustic loudspeaker 2b by means of a boundary 8'.

The boundary 8' results in a similar effect as that of the cross talk barrier 8 proposed in the embodiment of FIGS. 11 and 12, and thus, in other words, a cross talk barrier, which does not protrude the outside, can be realized, while it becomes possible to realize stereo sound reproduction of high acousticity in case of listening sounds.

Figure 15:
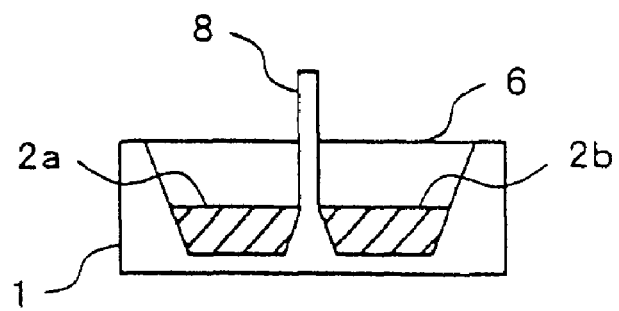
FIG. 15 is a diagram showing a third modified example of a schematic structure of the seventh embodiment in FIG. 11.

FIG. 15 is a diagram showing a third modified example of a schematic structure of the seventh embodiment in FIG. 11.

As shown in the present figure, acoustic loudspeakers 2a and 2b are located at more fallen, or recessed, positions than a position of a cabinet wall of portable information terminal 1, respectively. A cross talk barrier 8 prevents cross talk of sounds appeared between the acoustic loudspeakers 2a and 2b. In general, the higher height of the cross talk barrier 8 results in the more intensive effect, but when it projects from a cabinet wall position 6 of the portable information terminal 1, resulting in a possibility of troubles.

For this reason, when a cross talk barrier 8 is provided with respect to acoustic loudspeakers 2a and 2b, which have been situated in a fallen, or recessed, state as described above, an amount of projection corresponding to a depth of depression decreases. Thus, when compared with such a case where acoustic loudspeakers 2a and 2b are disposed closely to a cabinet wall position 6 of the portable information terminal 1 and no depression is defined (FIG. 12) on the cabinet wall position 6, a cross talk barrier 8, which decreases a portion protruding the outside, can be realized. On one hand, it becomes possible to reproduce stereo sounds of high acousticity.

Figure 16:
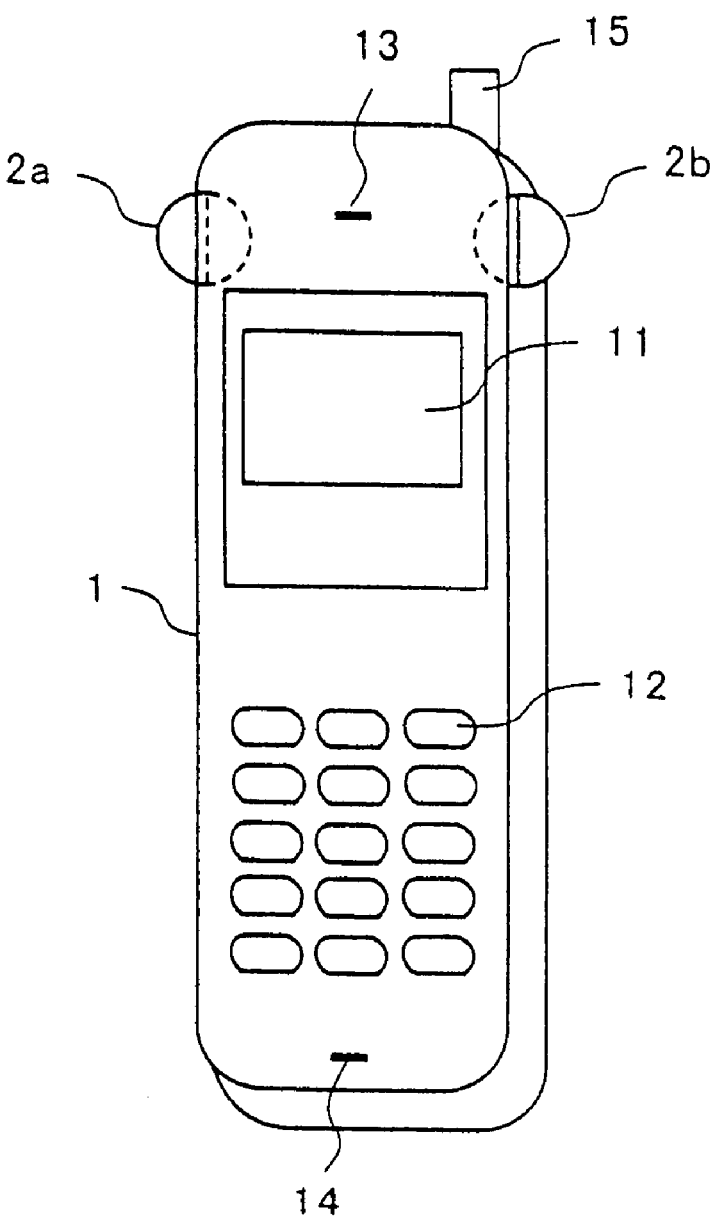
FIG. 16 is a view showing a schematic structure of a eighth embodiment of a sound reproducing system in a portable information terminal according to the present invention.

FIG. 16 is a view showing a schematic structure of an eighth embodiment of a sound reproducing system in a portable information terminal according to the present invention.

As shown in the present figure, in comparison with FIG. 1, an acoustic loudspeaker 2a is disposed in such that it protrudes from a left side of a portable information terminal 1 viewed from the front thereof, and the acoustic loudspeaker 2a is situated so as to direct frontward of the portable information terminal 1, while an acoustic loudspeaker 2b protrudes from a right side of the portable information terminal 1 viewed from the front thereof, and it is situated so as to direct frontward of the portable information terminal 1.

The acoustic loudspeakers 2a and 2b are disposed on a cabinet wall of the portable information terminal 1 at an angle of substantially ninety degrees at the position disposed. When the acoustic loudspeakers 2a and 2b are disposed on sides of the portable information terminal 1 in a state wherein they are protruded as described above, a distance between the acoustic loudspeakers 2a and 2b broadens as compared with an example of the sixth embodiment of the present invention shown in FIG. 11. Accordingly, cross talk arising from the acoustic loudspeakers 2a and 2b can be decreased without employing the cross talk barrier 8, so that it becomes possible to reduce the number of parts to be used, and further to reproduce stereo sounds of high acousticity.

Moreover, when the acoustic loudspeakers 2a and 2b are disposed on the portable information terminal 1 at positions where there are deeper than that of the above-described examples along the direction extending from the front to the back of the portable information terminal 1, the portable information terminal itself functions as a cross talk barrier for the acoustic loudspeakers 2a and 2b. Thus, cross talk of sounds produced from the acoustic loudspeakers 2a and 2b can be reduced, whereby reproduction of stereo sounds of high acousticity can be realized.

As mentioned above, an angle defined by the acoustic loudspeakers 2a and 2b and a cabinet wall may be freely changed.

Furthermore, since the acoustic loudspeakers 2a and 2b have been protruded from the portable information terminal 1, there is a possibility of troubles in case of carrying such portable information terminal. In this respect, the acoustic loudspeakers 2a and 2b are made to be capable of being contained in a cabinet of the portable information terminal 1 as a modified example of the eighth embodiment, and the acoustic loudspeakers 2a and 2b are arranged to be pull-out type, which can be pulled out from the cabinet in use of the portable information terminal 1. Thus, it becomes possible to avoid troubles as to protruded acoustic loudspeakers 2a and 2b in case of carrying the portable information terminal 1.

Figure 17:
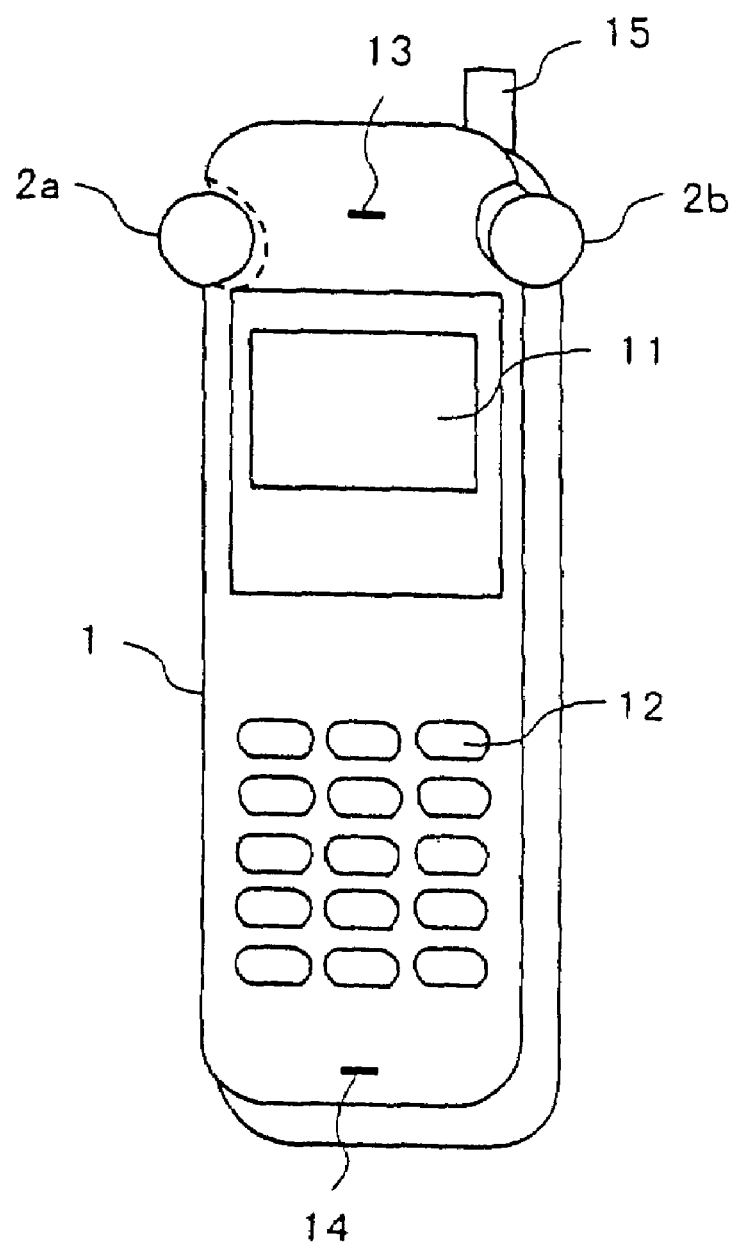
FIG. 17 is a view showing a schematic structure of a ninth embodiment of a sound reproducing system in a portable information terminal according to the present invention.

FIG. 17 is a view showing a schematic structure of a ninth embodiment of a sound reproducing system in a portable information terminal according to the present invention.

As shown in the present figure, in comparison with FIG. 11, an acoustic loudspeaker 2a is disposed in such that it protrudes from a left side of a portable information terminal 1 viewed from the front thereof, and the acoustic loudspeaker 2a is situated so as to direct frontward of the portable information terminal 1, while an acoustic loudspeaker 2b protrudes from a right side of the portable information terminal 1 viewed from the front thereof, and it is situated so as to direct frontward of the portable information terminal 1.

Moreover, each of the acoustic loudspeakers 2a and 2b is located at a position where there is somewhat deeper from the front of the portable information terminal 1. Such a cabinet wall residing on the front of the acoustic loudspeaker 2a or 2b at a position where it intercepts the acoustic loudspeakers 2a and 2b is removed further from that of the seventh embodiment of the present invention mentioned in FIG. 16, whereby a vibrating surface of the acoustic loudspeaker 2a or 2b is not covered by the cabinet wall. For this reason, sounds from both the fronts of the acoustic loudspeakers 2a and 2b are delivered to a listener, whereby a sound pressure can be more elevated.

In the present example, since the acoustic loudspeakers 2a and 2b are not allowed to protrude from the front of the portable information terminal 1, the portable information terminal 1 main body existing between the acoustic loudspeakers 2a and 2b functions as a cross talk barrier between both the loudspeakers, so that it becomes possible to reproduce stereo sounds of higher acousticity.

On the other hand, when the acoustic loudspeakers 2a and 2b have been protruded from the portable information terminal 1 as mentioned above, there is a possibility of troubles in case of carrying such portable information terminal. In this respect, the acoustic loudspeakers 2a and 2b are made to be capable of being contained in a cabinet of the portable information terminal 1 as a modified example of the ninth embodiment, and the acoustic loudspeakers 2a and 2b are arranged to be pull-out type, which can be pulled out from the cabinet in use of the portable information terminal 1. Thus, it becomes possible to avoid troubles as to the protruded acoustic loudspeakers 2a and 2b in case of carrying the portable information terminal 1.

Figure 18:
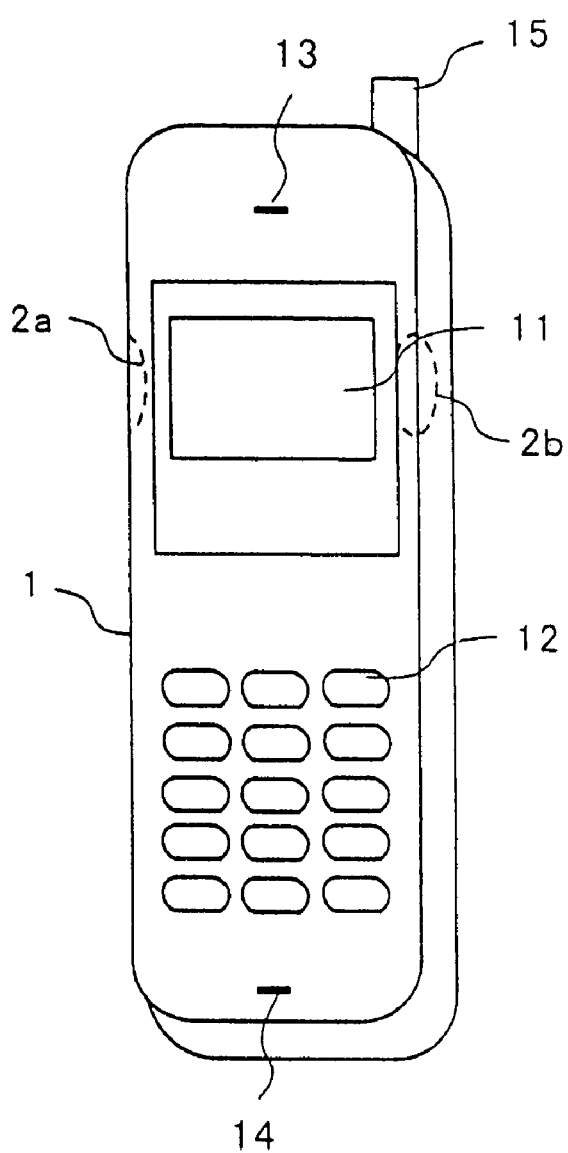
FIG. 18 is a view showing a schematic structure of a tenth embodiment of a sound reproducing system in a portable information terminal according to the present invention.

FIG. 18 is a view showing a schematic structure of a tenth embodiment of a sound reproducing system in a portable information terminal according to the present invention.

As shown in the present figure, in comparison with FIG. 11, an acoustic loudspeaker 2a is disposed on the front of a portable information terminal 1 in such a manner that the loudspeaker 2a extends to the left side of the portable information terminal viewed from the front thereof, while the acoustic loudspeaker 2b is disposed on the front of the portable information terminal 1 in such a manner that the loudspeaker 2b extends to the left side of the portable information terminal viewed from the front thereof.

In the present invention, in comparison with an example of FIG. 16, since the acoustic loudspeakers 2a and 2b do not protrude from a cabinet wall, the acoustic loudspeakers 2a and 2b do not result in troubles, so that a situation wherein these acoustic loudspeakers 2a and 2b are hooked by something can be avoided.

Furthermore, when the acoustic loudspeakers 2a and 2b are located outwards mutually to each other, cross talk in sounds from the acoustic loudspeakers 2a and 2b become slight, so that it becomes possible to realize reproduction of stereo sounds of higher acousticity.

Figure 19:
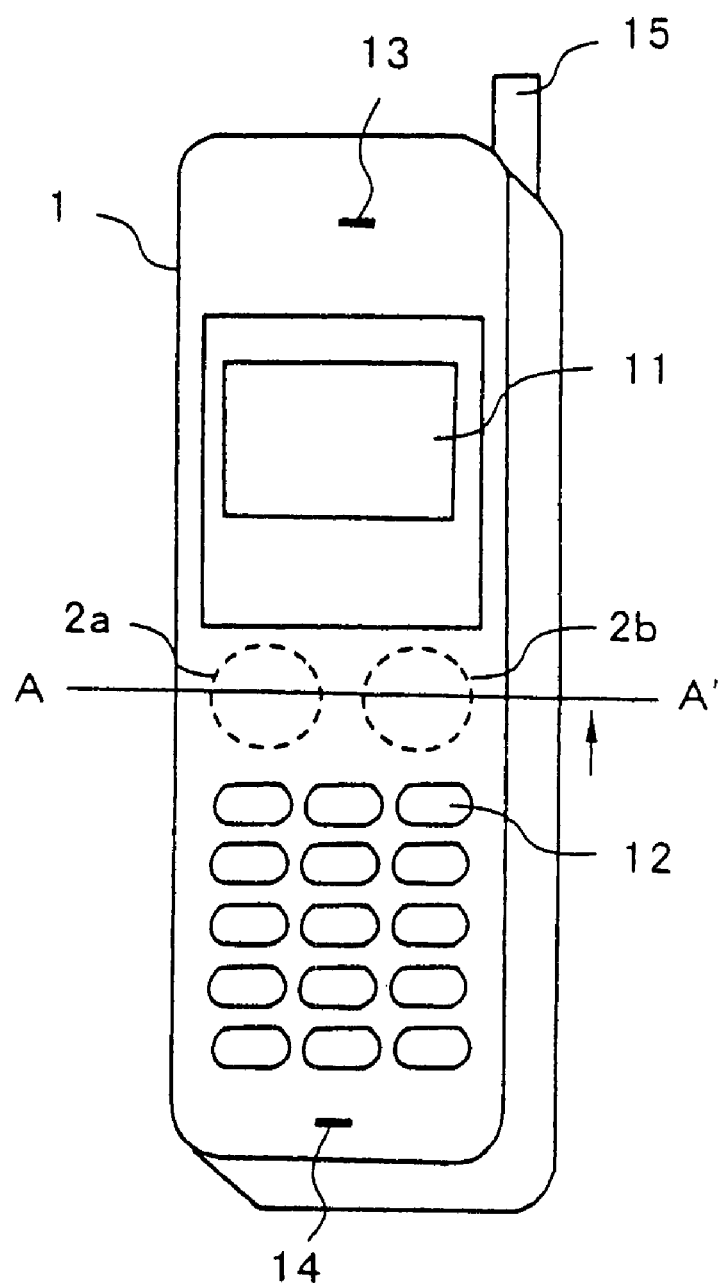
FIG. 19 is a view showing a schematic structure of a eleventh embodiment of a sound reproducing system in a portable information terminal according to the present invention.
Figure 20:
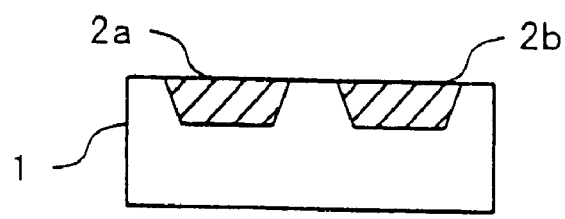
FIG. 20 is a schematic constitutional view of A-A' section involving acoustic loudspeakers 2a and 2b in FIG. 19 viewed from a direction of the arrow.

FIG. 19 is a view showing a schematic structure of a eleventh embodiment of a sound reproducing system in a portable information terminal according to the present invention, and FIG. 20 is a schematic constitutional view of A-A' section involving acoustic loudspeakers 2a and 2b in FIG. 19 viewed from a direction of the arrow.

As shown in the present figure, in comparison with FIG. 1, acoustic loudspeakers 2a and 2b are disposed on the front of a portable information terminal 1 in such that both surfaces of the acoustic loudspeakers 2a and 2b coincide with a surface of the portable information terminal 1, these loudspeakers 2a and 2b are aligned horizontally, and they are positioned between a screen display monitor 11 and a key panel 12.

In the present embodiment, since no cross talk barrier 8 of FIG. 11 is provided, the following signal processing for eliminating cross talk is made in place of provision of the cross talk barrier 8.

Figure 21:
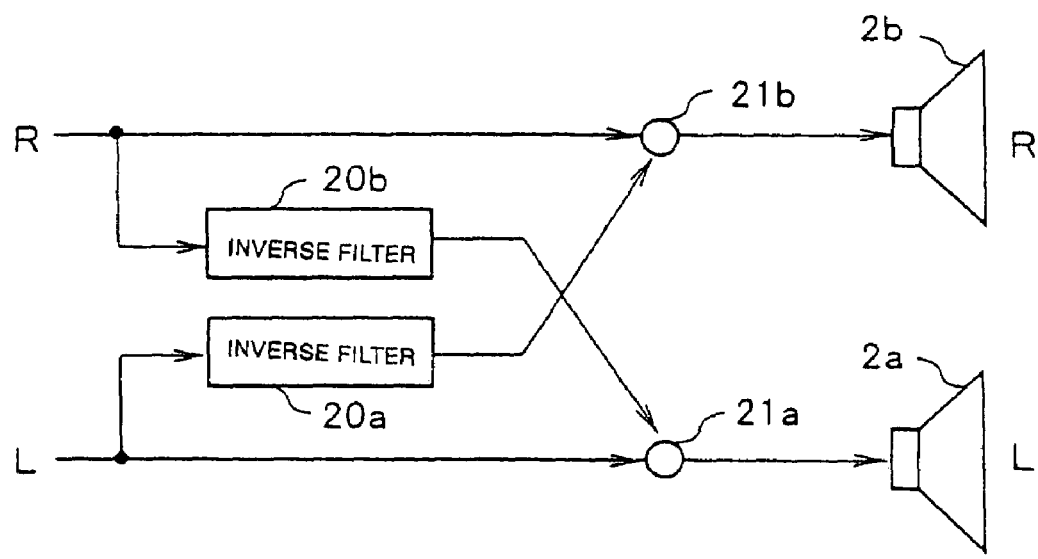
FIG. 21 is a schematic diagram showing a circuit for executing signal processing of cross talk elimination.

FIG. 21 is a schematic diagram showing a circuit for executing signal processing of cross talk elimination. As shown in the present figure, inverse filters 20a and 20b are provided for inputting branch signals of left (L) and right (R) signals to the acoustic loudspeakers 2a and 2b.

The inverse filters 20a and 20b invert each phase of input branch signals. An adder 21a is disposed between a branch point of the right (R) signals and the acoustic loudspeaker 2a, while an adder 21b is disposed between a branch point of the left (L) signals and the acoustic loudspeaker 2b. The adder 21a adds the right (R) signals to output signals of the inverse filter 20a to output the resulting signals to the acoustic loudspeaker 2a, while the adder 21b adds the left (L) signals to output signals of the inverse filter 20b to output the resulting signals to the acoustic loudspeaker 2b.

Figure 22:
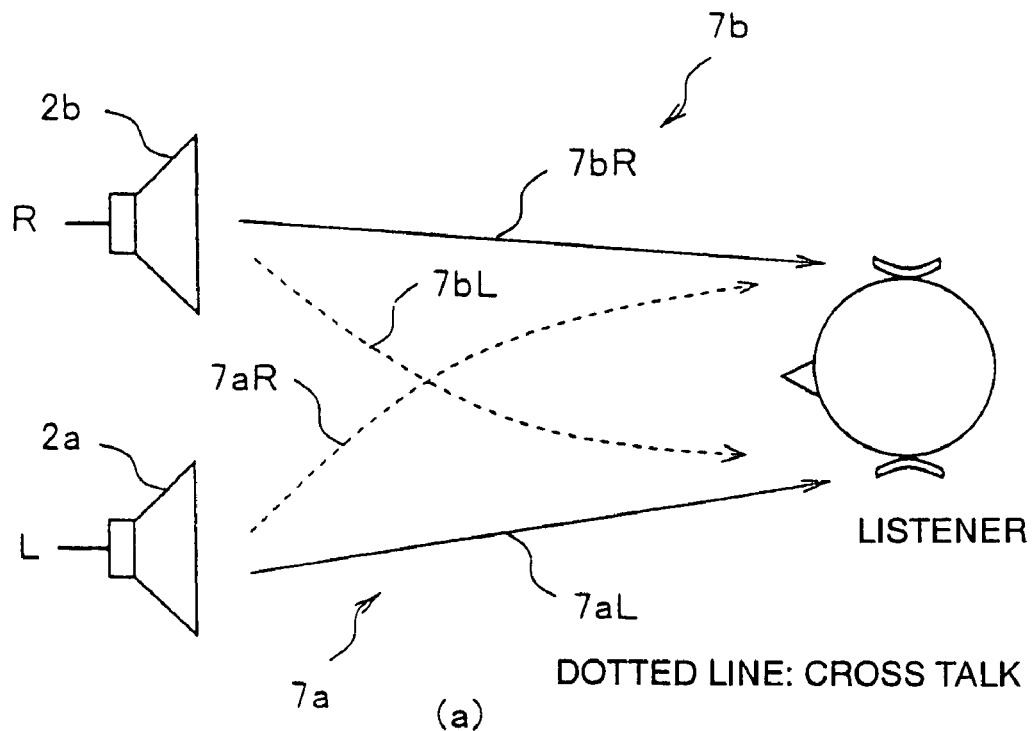
FIGS. 22(a) and 22(b) are schematic diagrams each explaining for eliminating operation of cross talk in FIG. 21.
Figure 22:
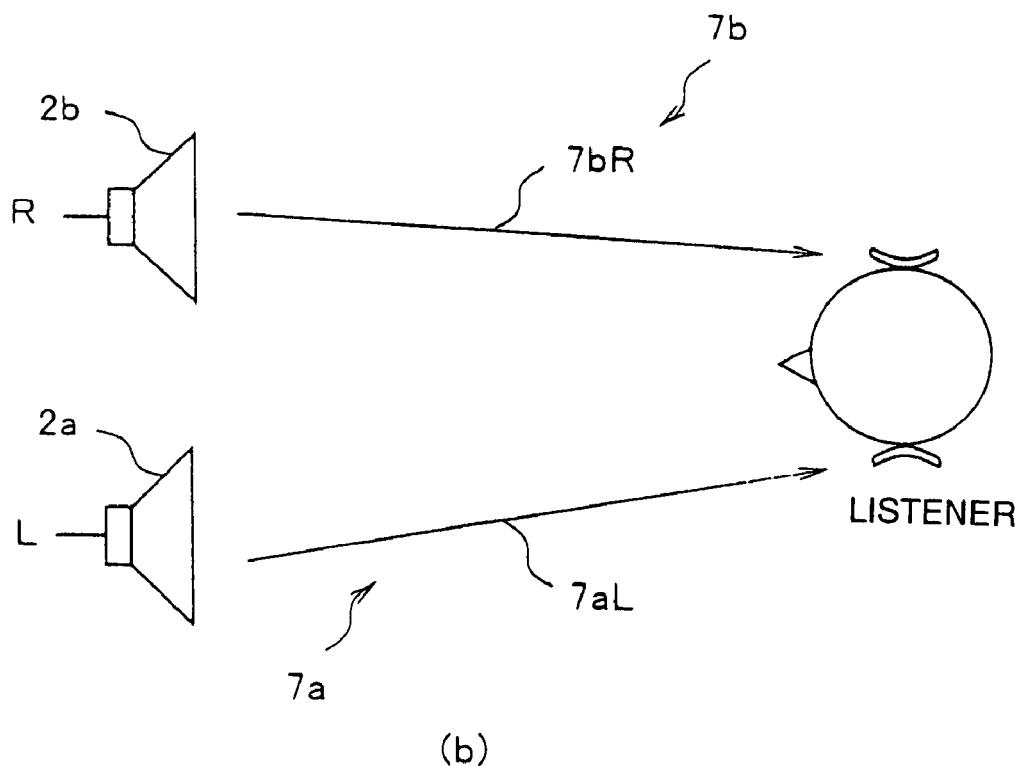

FIGS. 22(a) and 22(b) are schematic diagrams each explaining for eliminating operation of cross talk in FIG. 21. As shown in FIG. 22(a), cross talks 7aR and 7bL are involved in sounds from acoustic loudspeakers 2a and 2b to a listener in propagating directions 7a and 7b, respectively, as mentioned above.

As shown in FIG. 22(b), when signal processing for cross talk is made, sounds as cross talks in the propagating directions 7aR and 7bL are cancelled by sounds, which have been phase-inverted, so that the cross talks are eliminated.

Figure 23:
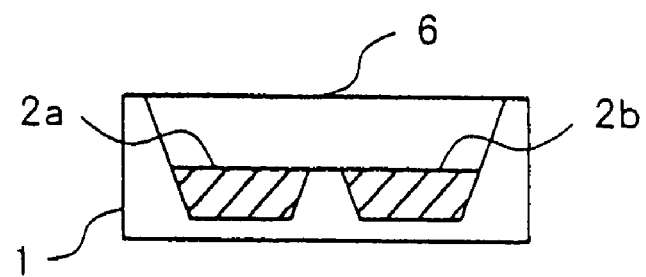
FIG. 23 is a diagram showing a first modified example of the eleventh embodiment in FIG. 20.

FIG. 23 is a diagram showing a first modified example of the eleventh embodiment in FIG. 20.

As shown in the present figure, each of the acoustic loudspeakers 2a and 2b is located at a position that is further fallen, or recessed, than a cabinet wall 6 of a portable information terminal 1. Hence, a key panel or the like may be placed on a part or the whole of the cabinet wall 6 of the portable information terminal 1 corresponding to a surface on which the acoustic loudspeakers 2a and 2b have been disposed, so that efficient arrangement of parts can be made in the portable information terminal 1.

Figure 24:
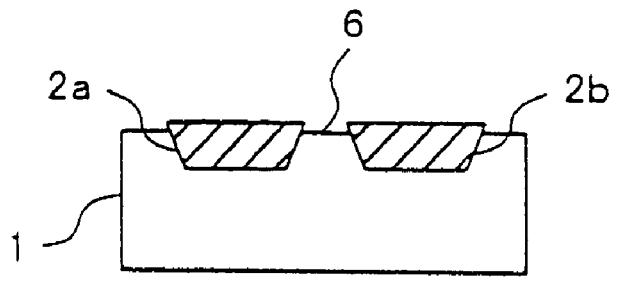
FIG. 24 is a diagram showing a second modified example of the eleventh embodiment in FIG. 20.

FIG. 24 is a diagram showing a second modified example of the eleventh embodiment in FIG. 20.

As shown in the present figure, when acoustic loudspeakers 2a and 2b are partially protruded from a cabinet of a portable information terminal 1, an internal space of the cabinet corresponding to a protruded portion is saved, so that other parts may be disposed in the internal space thus saved, or the whole cabinet can be downsized, whereby it is possible to realize a more compact and weight-saved portable information terminal 1.

Figure 25:
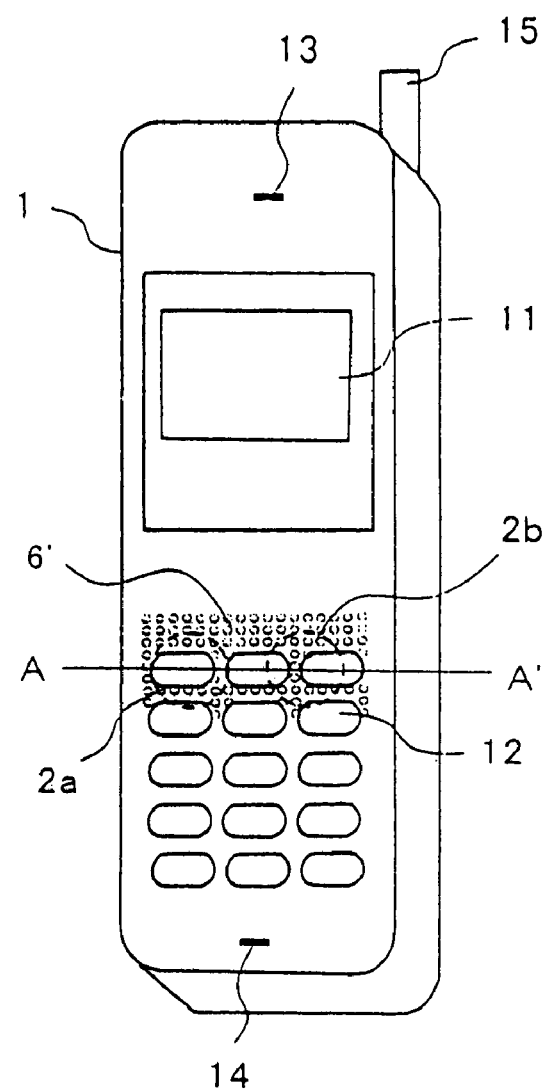
FIG. 25 is a view showing a schematic structure of a twelfth embodiment of a sound reproducing system in a portable information terminal according to the present invention.
Figure 26:
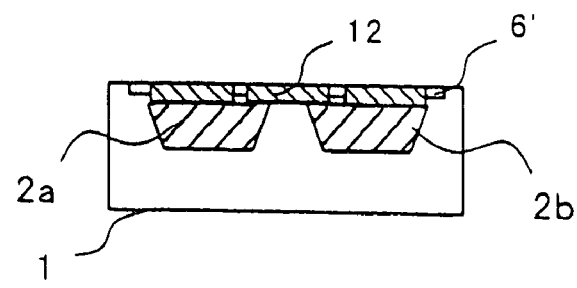
FIG. 26 is a schematic constitutional view of A-A' section involving acoustic loudspeakers 2a and 2b in FIG. 25 viewed from a direction of the arrow.

FIG. 25 is a view showing a schematic structure of a twelfth embodiment of a sound reproducing system in a portable information terminal according to the present invention, and FIG. 26 is a schematic constitutional view of A-A' section involving acoustic loudspeakers 2a and 2b in FIG. 25 viewed from a direction of the arrow.

As shown in the present figures, in comparison with FIG. 19, acoustic loudspeakers 2a and 2b extend to a part of a key panel 12 and are disposed inside a cabinet of the portable information terminal 1 in a fallen, or recessed, state. Thus, a ratio of area occupied by the acoustic loudspeakers is reduced with respect to a portable information terminal 1. According to such constitution as described above, a cabinet wall of the portable information terminal can be utilized for other use application such as a key panel, whereby downsizing of portable information terminal can be realized.

Moreover, it is arranged in such that the acoustic loudspeakers 2a and 2b are covered with a perforated section 6' of a cabinet wall, so that sounds are propagated through the perforated section 6' of the cabinet wall, whereby a sufficient sound pressure is obtained.

Furthermore, cross talk in the acoustic loudspeakers 2a and 2b is eliminated by means of the signal processing circuit of FIG. 21. Hence, it becomes possible to realize reproduction of stereo sounds of high acousticity can be realized with a sufficient sound pressure in case of listening sounds.

Figure 27:
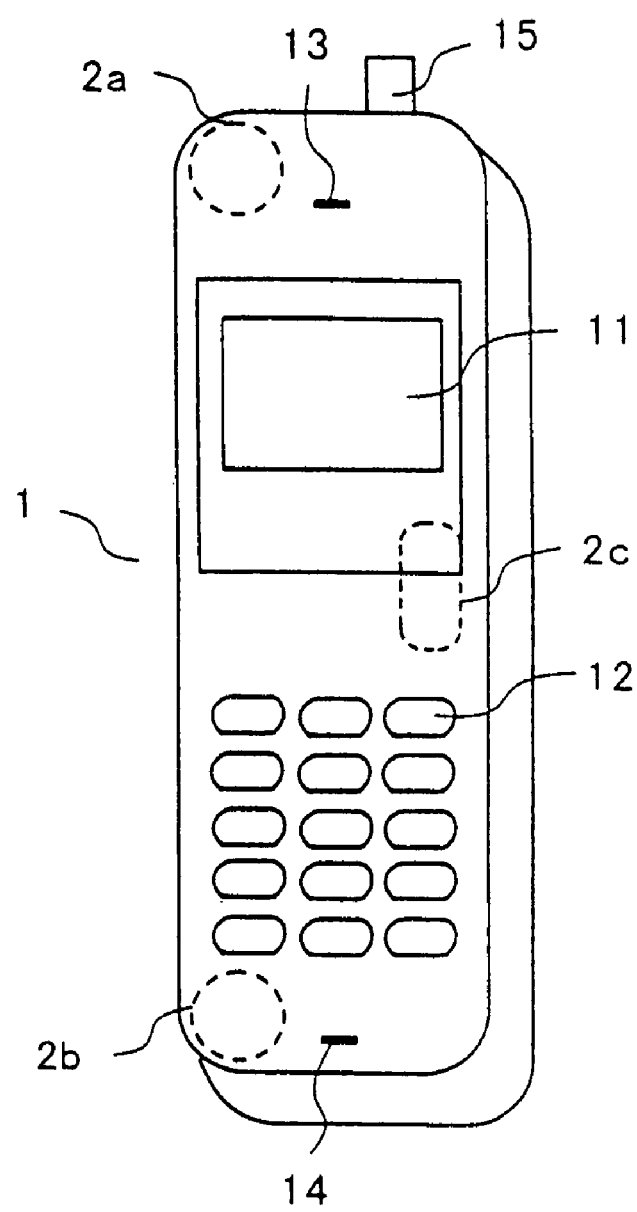
FIG. 27 is a view showing a schematic structure of a thirteenth embodiment of a sound reproducing system in a portable information terminal according to the present invention.
Figure 28:
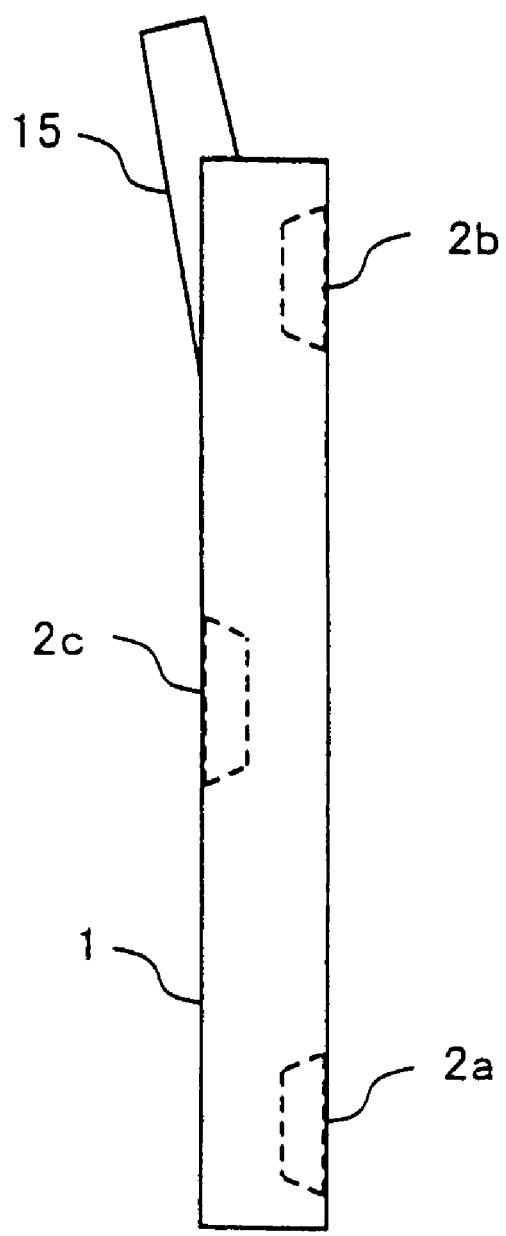
FIG. 28 is a side view showing the portable information terminal of FIG. 27.

FIG. 27 is a view showing a schematic structure of a thirteenth embodiment of a sound reproducing system in a portable information terminal according to the present invention, and FIG. 28 is a side view showing the portable information terminal of FIG. 27.

As shown in the present figures, in comparison with FIG. 4, acoustic loudspeakers 2a and 2b are located frontwards with respect to the portable information terminal 1 at the opposite ends in the same side thereof along the longitudinal direction of the portable information terminal 1, while an acoustic loudspeaker 2c is located rearwards with respect to the portable information terminal 1 at a central part along the longitudinal direction thereof. Namely, the acoustic loudspeaker 2c is placed so as to have an angle of 180 degrees with respect to acoustic loudspeakers 2a and 2b.

To the acoustic loudspeakers 2a and 2b, characteristics, which are specialized to middle- to high-pitched tone ranges, are given, while a characteristic, which is specialized to low-pitched tone range, is given to the acoustic loudspeaker 2c, whereby it is allowed to function as a woofer, so that it becomes possible to reproduce sounds of higher acousticity in broadband.

Moreover, it is constituted in such that directions of the acoustic loudspeakers 2a, 2b, and 2c are movable as a modified example of the twelfth embodiment of the present invention.

For instance, when the portable information terminal 1 is placed at a low position, the acoustic loudspeakers 2a, 2b, and 2c are set upwards. On one hand, when sounds spreading a wide area are desired to acquire, for example, when sounds are desired to be listened by many persons, the acoustic loudspeakers are set outwards so as to be easily listened. As described above, according to the present modification, it is possible to select optimum directions for speakers as the case may be, whereby versatility can be elevated.

Figure 29:
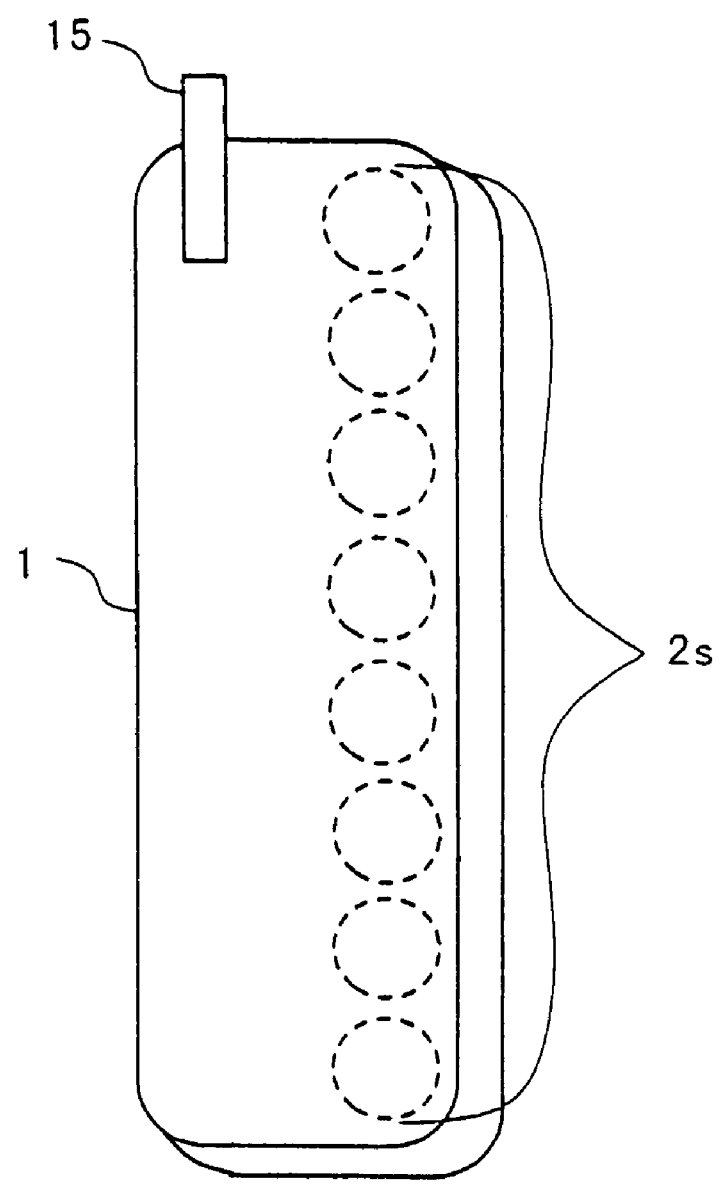
FIG. 29 is a view showing a schematic structure of a fourteenth embodiment of a sound reproducing system in a portable information terminal according to the present invention.

FIG. 29 is a view showing a schematic structure of a fourteenth embodiment of a sound reproducing system in a portable information terminal according to the present invention.

As shown in the present figure, an acoustic loudspeaker array 2s is disposed on a portable information terminal 1 wherein the acoustic loudspeaker array 2s is an alignment of a plurality of acoustic loudspeakers being aligned rearwards with respect to the portable information terminal 1 in a row along the longitudinal direction of the portable information terminal 1.

Figure 30:
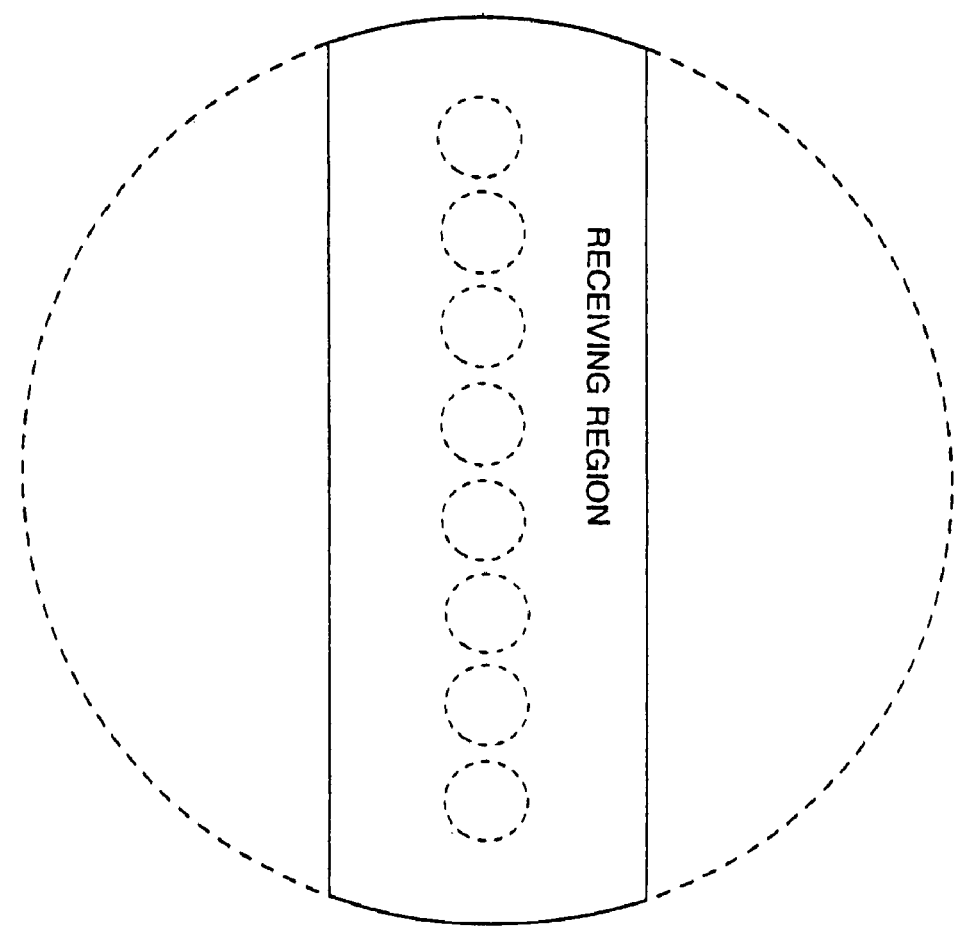
FIG. 30 is a diagram showing directivity of an acoustic sound speaker array 2s of FIG. 29.

FIG. 30 is a diagram showing directivity of an acoustic sound speaker array 2s of FIG. 29. As shown in the present figure, directivity is improved in a direction of the acoustic loudspeaker array 2s. In the case where sounds are listened by a small number of listeners by means of the present portable information terminal 1 in a place such as coffee house, it is possible to arrange in such that sounds are delivered to only the listeners, but not the third party, so that listening of sounds in which harassment with respect to a surrounding area can be avoided without employing headphone and the like.

Figure 31:
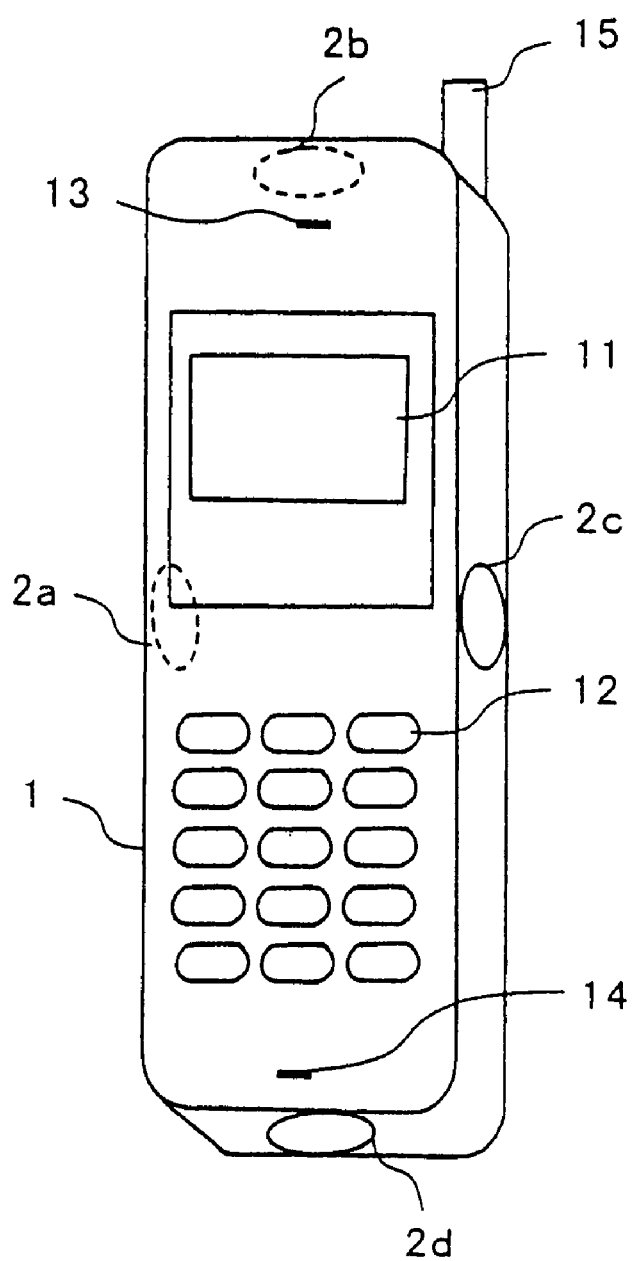
FIG. 31 is a view showing a schematic structure of a fifteenth embodiment of a sound reproducing system in a portable information terminal according to the present invention.

FIG. 31 is a view showing a schematic structure of a fifteenth embodiment of a sound reproducing system in a portable information terminal according to the present invention.

As shown in the present figure, in comparison with FIG. 1, acoustic loudspeakers 2a, 2b, 2c, and 2d are disposed around a portable information terminal 1. As described above, when the acoustic loudspeakers 2a, 2b, 2c, and 2d are placed all around, more effective omnidirectional effect can be elevated. Thus, it is convenient for such a case where sounds are listened by a large number of persons.

In the following, an example wherein a directivity of acoustic sound propagation is converged to a certain direction, and an example wherein acoustic sound propagation is allowed to more widely expand, in other words, it makes to be omnidirectional will be described.

Figure 32:
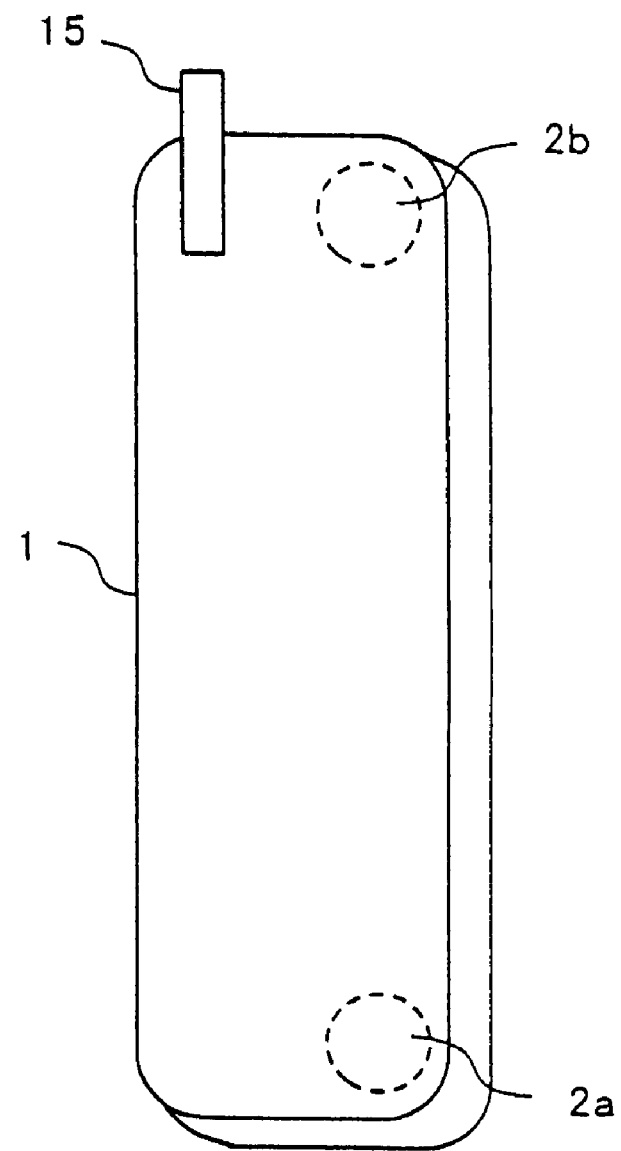
FIG. 32 is a view showing a schematic structure of a sixteenth embodiment of a sound reproducing system in a portable information terminal according to the present invention.

FIG. 32 is a view showing a schematic structure of a sixteenth embodiment of a sound reproducing system in a portable information terminal according to the present invention.

As shown in the present figure, in comparison with FIG. 29, only two acoustic loudspeakers 2a and 2b are disposed at opposite ends of the portable information terminal 1 in the longitudinal direction thereof in such a manner that they are located rearwards with respect to the portable information terminal 1. Directivities of acoustic sound propagation of the acoustic loudspeakers 2a and 2b are converged to a certain direction by means of signal processing as described hereunder.

FIGS. 33(a) and 33(b) are diagrams each explaining a circuit example of signal processing for converging directivities of the acoustic loudspeakers 2a and 2b of FIG. 32.

As shown in FIG. 33(a), a delay means 22 is disposed to an input side of, for example, the acoustic loudspeaker 2b between the acoustic loudspeakers 2a and 2b.

It is supposed that directivity is converged in a direction of acoustic sound propagation indicated by dotted lines in the acoustic loudspeakers 2a and 2b in the case where no delay means 22 is provided.

In the case where the delay means 22 is provided, a right (R) signal is more delayed than a left (L) signal, so that a directivity of sounds produced by the acoustic loudspeakers 2a and 2b is converged from the case where no delay exists to the case where the delay is present as shown in FIG. 33(a).

In this respect, when an arbitrary amount of delay is set, it becomes possible to converge arbitrarily a direction of directivity in sounds.

As shown in FIG. 33(b), an attenuator 23 is disposed on an input side of, for example, the acoustic loudspeaker 2b between the acoustic loudspeakers 2a and 2b.

In the case where no attenuator 23 exists, it is considered that directivity is converged in a propagating direction of sounds indicated by dotted lines in the acoustic loudspeakers 2a and 2b.

By means of the attenuator 22, right (R) signal comes to have a smaller amplitude than that of left (L) signal, whereby directivity of sounds produced by the acoustic loudspeakers 2a and 2b is converged towards a direction of the case where there is no attenuation to the case where there is an attenuation as shown in FIG. 33(a).

Accordingly, when an arbitrary amount of attenuation is set, it becomes possible to converge arbitrarily a direction of directivity in sounds.

As described above, since directivity can be converged to a certain direction, it is possible to maintain such a situation that sounds are delivered to only a small number of listeners in case of listening such sounds in a coffee shop or the like by a small number of these listeners, but not delivered to the third party. Thus, it is possible to listen sounds by a small number of acoustic loudspeakers without accompanying harassment to a surrounding area with no use of headphones, earphones, and the like.

Figure 34:
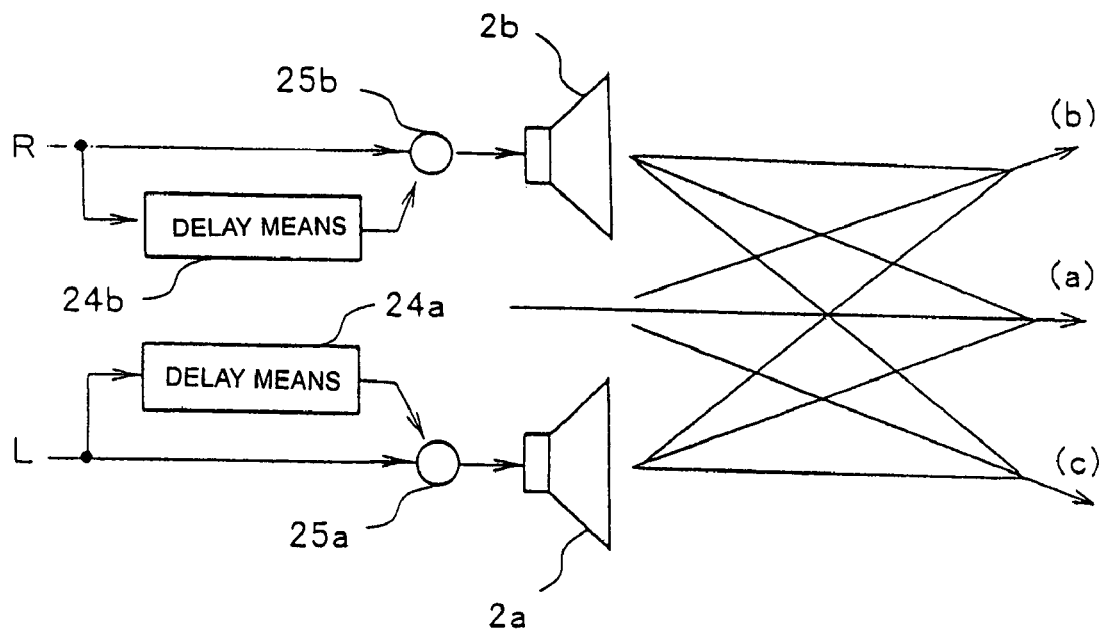
FIGS. 34(a), 34(b), and 34(c) correspond to a first modified example of the sixteenth embodiment of FIG. 32 and are diagrams for explaining examples of signal processing wherein directivities of acoustic loudspeakers 2a and 2b are allowed to be omnidirectional.

FIGS. 34(a), 34(b), and 34(c) correspond to a first modified example of the sixteenth embodiment of FIG. 32 and are diagrams for explaining circuit examples of signal processing wherein directivities of acoustic loudspeakers 2a and 2b are allowed to be omnidirectional.

As shown in the present figures, a delay means 24a for branching left (L) signals to delay the same and an adder 25a for adding signals thus delayed by the delay means 24a to the original left (L) signals to output the same to an acoustic loudspeaker 2a are disposed on an input side of the acoustic loudspeaker 2a.

Furthermore, a delay means 24b for branching right (R) signals to delay the same and an adder 25b for adding signals thus delayed by the delay means 24b to the original right (R) signals to output the same to an acoustic loudspeaker 2b are disposed on an input side of the acoustic loudspeaker 2b.

A propagating direction of sounds produced by the acoustic loudspeakers 2a and 2b in the case where there is no delay in both left (L) and right (R) signals corresponds to a direction (a) as shown in the present figures.

A propagating direction of sounds produced by the acoustic loudspeakers 2a and 2b in the case where there is a delay in right (R) signals, while there is no delay in left (L) signals corresponds to a direction (b) as shown in the present figures.

A propagating direction of sounds produced by the acoustic loudspeakers 2a and 2b in the case where there is no delay in right (R) signals, while there is a delay in left (L) signals corresponds to a direction (c) as shown in the present figures.

A propagating direction of sounds produced through the acoustic loudspeakers 2a and 2b in the case where there is a delay in right (R) signals and there is also a delay in left (L) signals corresponds to a direction (a) as shown in the present figures, if both amounts of delay are equal to each other.

As mentioned above, when acoustic loudspeakers are disposed only either side of a portable information terminal 1 in the case where sounds are listened from the portable information terminal 1 positioned at the center of a surrounding circle by listeners situated on the circle, it is anticipated that listening of sounds becomes difficult on a side where no acoustic loudspeaker is provided.

However, according to signal processing of the present invention, omnidirectional effect wherein propagation of sounds is more widely expanded is realized, whereby listening of sounds with a single portable information terminal 1 becomes possible by a number of listeners without adding any acoustic loudspeaker.

While one each of delay means have been disposed on input sides of the acoustic loudspeakers 2a and 2b, the invention is not limited thereto, but a plurality of delay means each having a different delay amount my be provided. As a result, more smooth omnidirectional effect can be realized. In addition, when the number of loudspeakers is increased, broader listening of sounds becomes possible.

According to the time and circumstances, the number of listeners and a place where sounds to be listened change, so that if functions for the above described signal processing is simple, there is a case where disadvantages arise.

In order to avoid such disadvantages, countermeasures therefor will be described hereunder.

Figure 35:
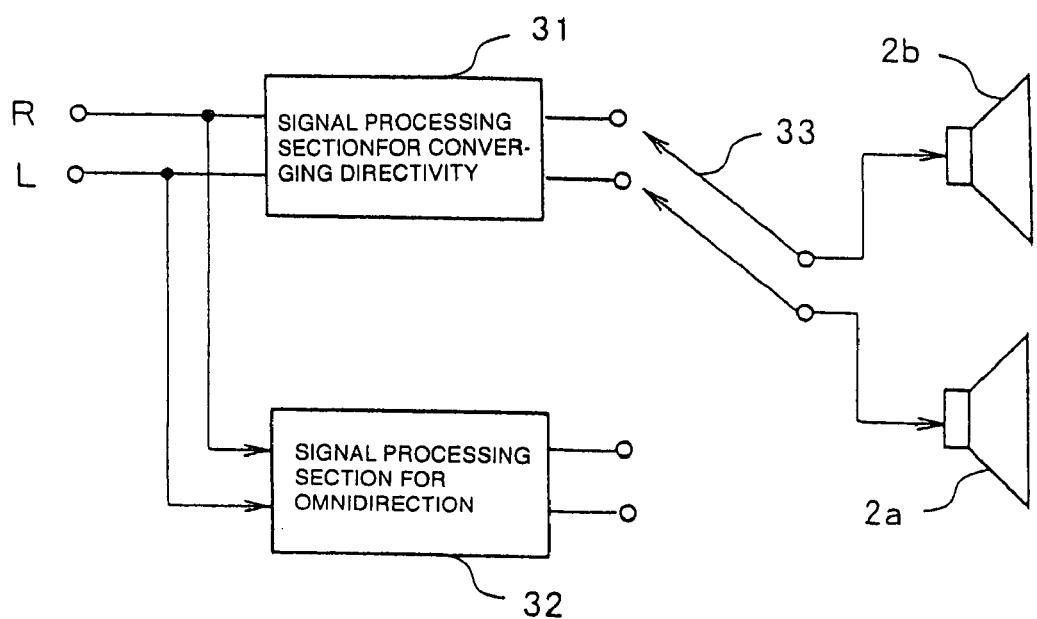
FIG. 35 is a view showing a schematic structure of a seventeenth embodiment of a sound reproducing system in a portable information terminal according to the present invention.

FIG. 35 is a view showing a schematic structure of a seventeenth embodiment of a sound reproducing system in a portable information terminal according to the present invention.

As shown in the present figure, a directional processing section for converging signals 31, an omnidirectional signal processing section 32, and a switching section 33 are disposed on an input side of acoustic loudspeakers 2a and 2b.

Figure 33:
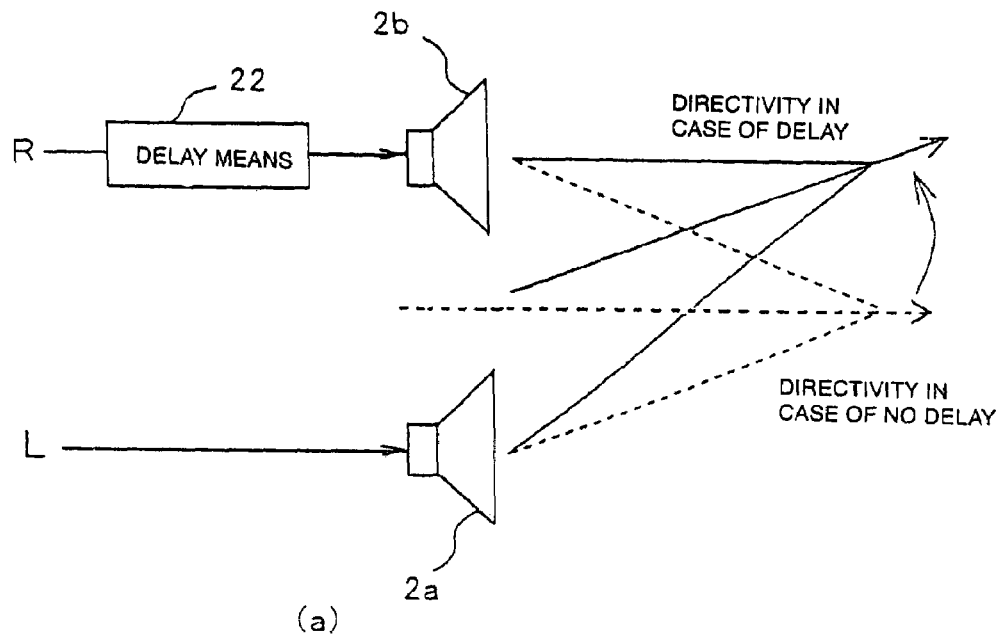
FIGS. 33(a) and 33(b) are diagrams each explaining a circuit example of signal processing for converging directivities of the acoustic loudspeakers 2a and 2b of FIG. 32.
Figure 33:
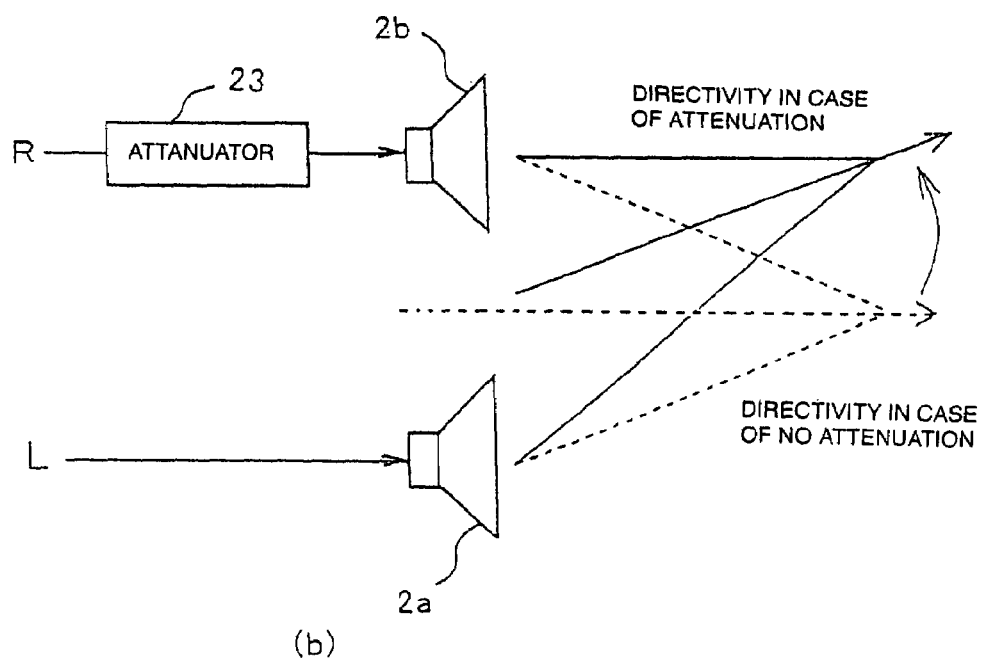

The directional processing section for converging signals 31 has a constitution as shown in FIG. 33 and executing signal processing for converging directivity in a certain direction.

The omnidirectional signal processing section 32 has a constitution as shown in FIGS. 34(a), 34(b), and 34(c) and executing signal processing for producing an omnidirectional condition.

The switching section 33 selects alternatively the directional processing section for converging signals 31 or the omnidirectional signal processing section 32.

As described above, since signal-processing functions are made to be selectable, optimum signal processing can be made according to circumstances; besides, comfortable listening of sounds becomes always possible.

Figure 36:
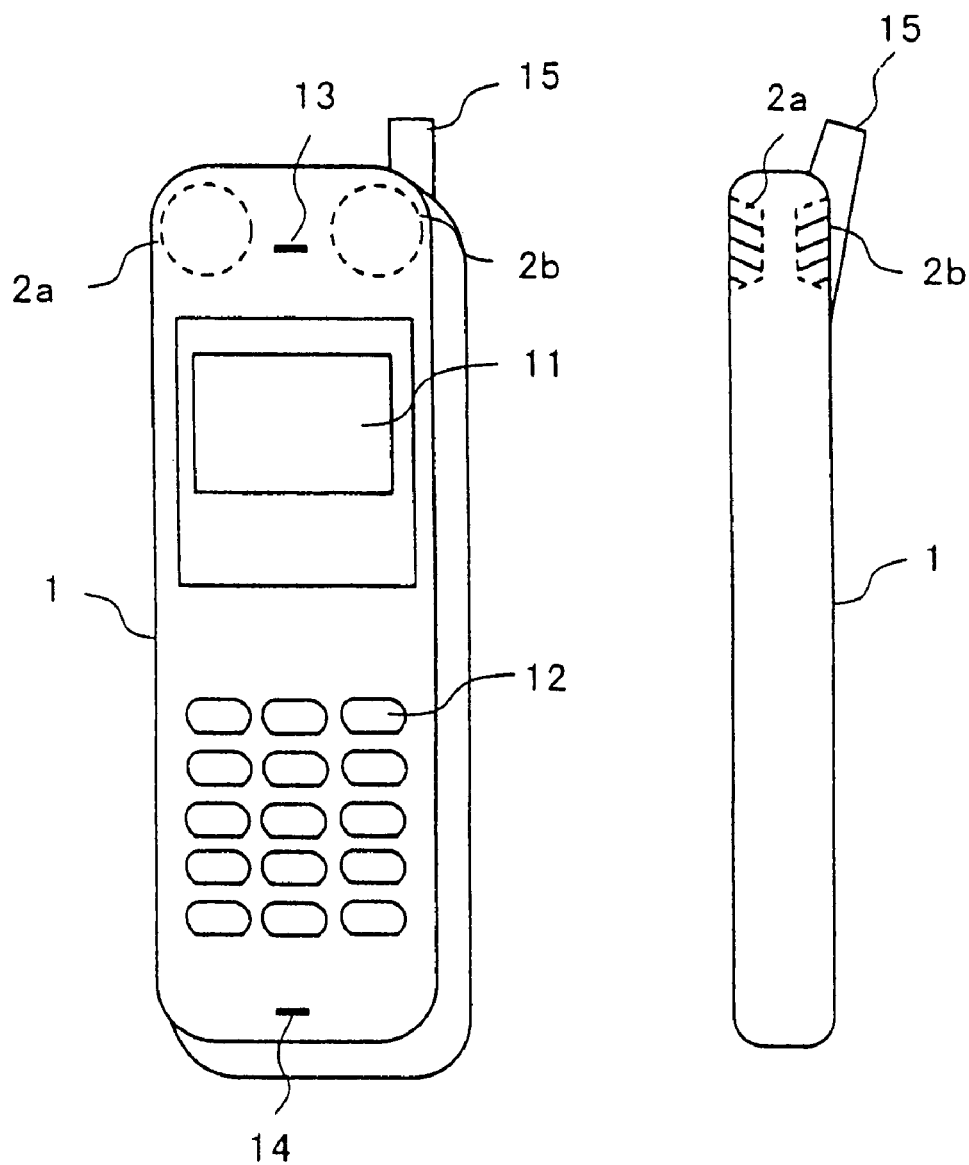
FIG. 36 is a view showing a schematic structure of an eighteenth embodiment of a sound reproducing system in a portable information terminal according to the present invention.

FIG. 36 is a view showing a schematic structure of an eighteenth embodiment of a sound reproducing system in a portable information terminal according to the present invention.

As shown in the present figure, in comparison with FIG. 1, acoustic loudspeakers 2a and 2b are disposed horizontally on the upper part of a portable information terminal 1 wherein the acoustic loudspeaker 2a directs frontwards from the portable information terminal 1, while the acoustic loudspeaker 2b directs rearwards from the portable information terminal 1, whereby they direct different directions at an angle of 180 degrees one another.

Figure 37:
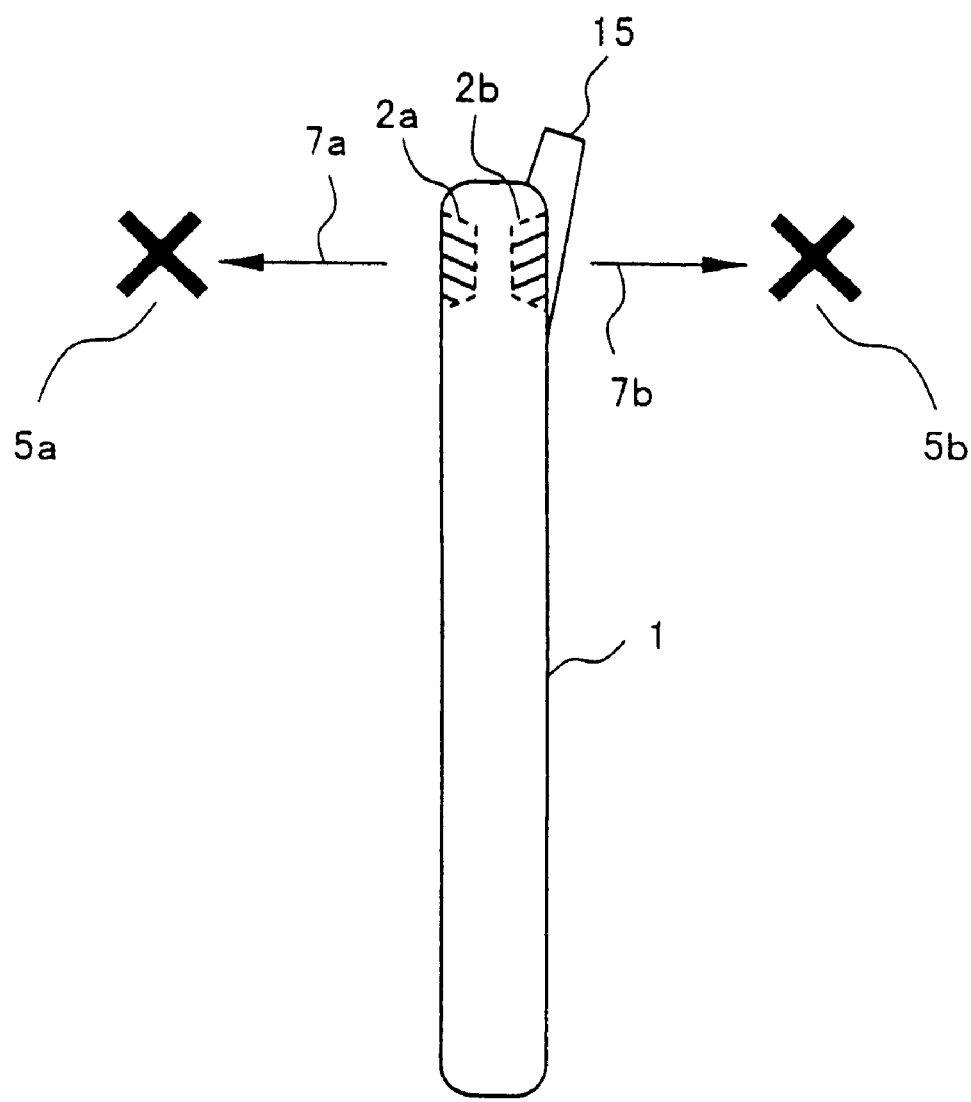
FIG. 37 is a view indicating propagating directions of sounds from the portable information terminal 1 in FIG. 36.

FIG. 37 is a view indicating propagating directions of sounds from the portable information terminal 1 in FIG. 36. As shown in the present figure, positions 5a and 5b for listening sounds are those at which sounds delivered from the acoustic loudspeakers 2a and 2b are to be listened. Propagating directions 7a and 7b of sounds indicate propagating directions of those produced from the acoustic loudspeakers 2a and 2b.

From the acoustic loudspeakers 2a and 2b, individually different sounds, for example voices of two different languages are listened by a plurality of persons. In this case, for instance, persons who wish to listen a language from the acoustic loudspeaker 2a may hear the language at the position 5a for listening sounds, while persons who wish to listen another language from the acoustic loudspeaker 2b may hear the language at the position 5b for listening sounds. As a result, it becomes possible to listen a plurality of languages at the same time by the use of a single portable information terminal 1.

Furthermore, when the acoustic loudspeakers 2a and 2b are disposed on both the surfaces of the portable information terminal 1, an effect for making sounds omnidirectional is also obtained. Hence, in the case where sounds are listened from the portable information terminal 1 positioned at the center of a surrounding circle by listeners situated on the circle, it becomes possible to listen sounds by a number of persons with the use of a single portable information terminal 1.

For instance, when sounds are listened in a condition as described above in case of outing, such purpose can be achieved by a single portable information terminal 1, so that there is no need for taking other external loudspeakers or the like with the portable information terminal 1. Thus, reduction of baggage becomes possible, besides such a situation that one neglects to bring a sound reproducing system with him (or her) can be avoided, because such portable information terminal 1 is usually carried by a user in case of outing.

Figure 38:
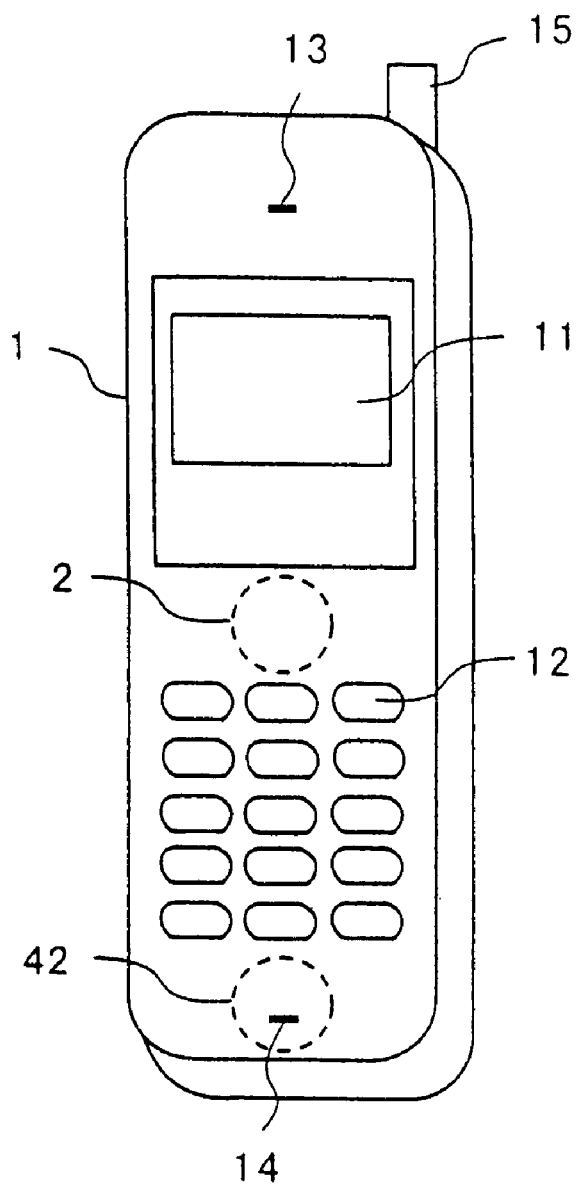
FIG. 38 is a view showing a schematic structure of a nineteenth embodiment of a sound reproducing system in a portable information terminal according to the present invention.

FIG. 38 is a view showing a schematic structure of a nineteenth embodiment of a sound reproducing system in a portable information terminal according to the present invention.

As shown in the present figure, in comparison with FIG. 1, an acoustic sound loud speaker 2, and an acoustic loudspeaker serving also as speaking microphone 42 are disposed on a portable information terminal 1.

As described above, when an acoustic loudspeaker is used also as a speaking microphone, the number of parts to be used in a portable information terminal is reduced, so that downsizing and weight reduction of the portable information terminal can be realized.

Figure 39:
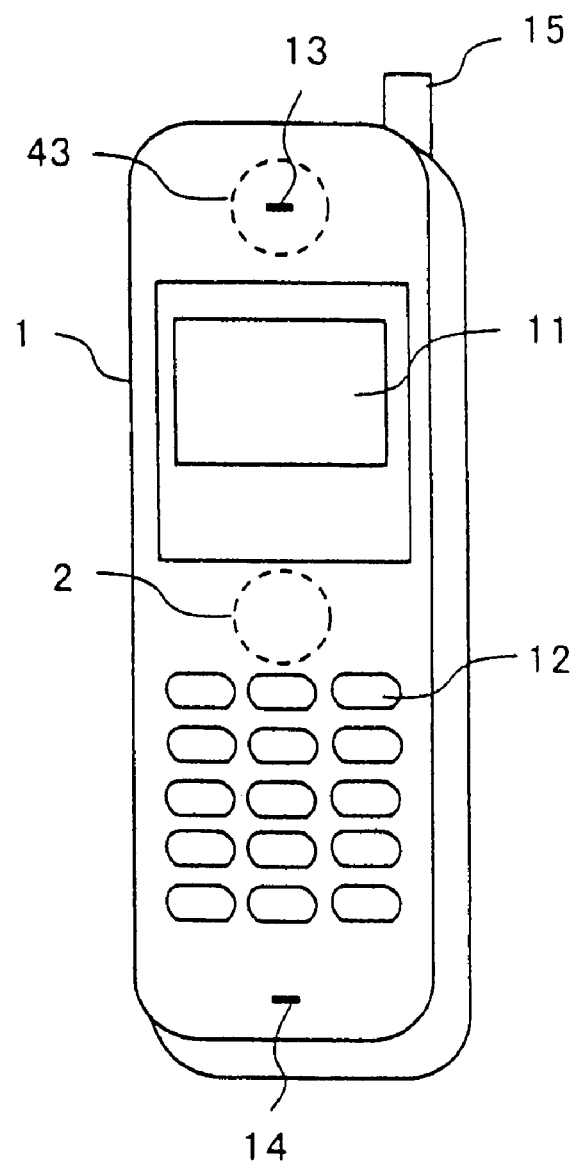
FIG. 39 is a view showing a first modified example of the nineteenth embodiment in FIG. 38.

FIG. 39 is a view showing a first modified example of the nineteenth embodiment in FIG. 38.

As shown in the present figure, an acoustic sound loud speaker 2, and an acoustic loudspeaker serving also as receiving speaker 43 are disposed on a portable information terminal 1.

As described above, when an acoustic loudspeaker is used also as a receiving speaker, the number of parts to be used in a portable information terminal is reduced, so that downsizing and weight reduction of the portable information terminal can be realized.

Figure 40:
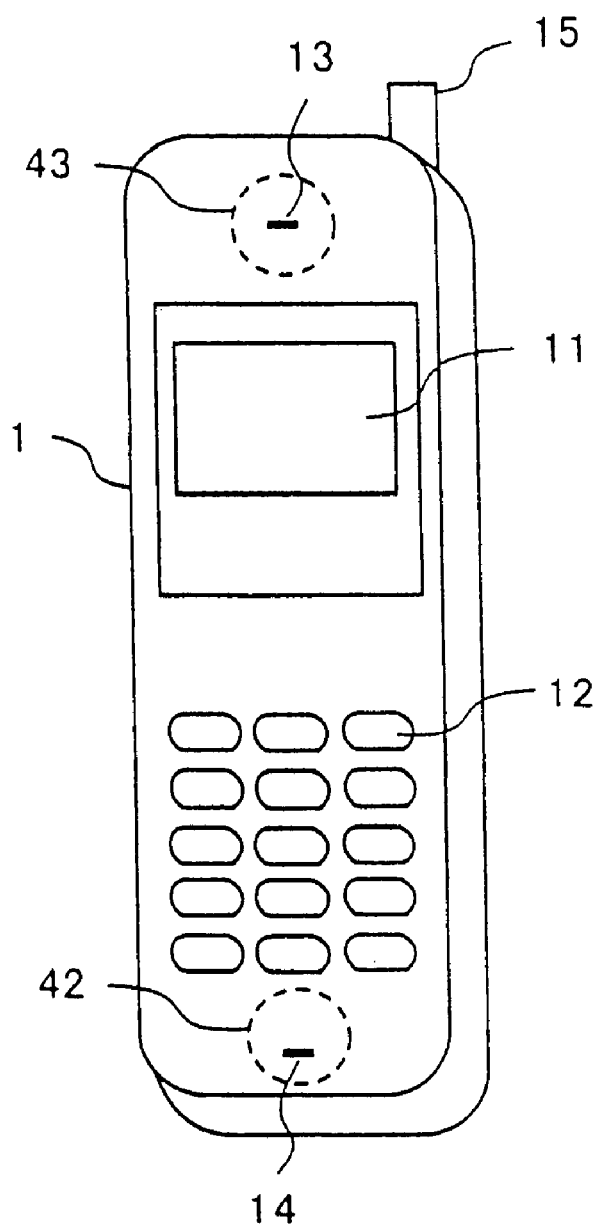
FIG. 40 is a view showing a second modified example of the nineteenth embodiment in FIG. 38.

FIG. 40 is a view showing a second modified example of the nineteenth embodiment in FIG. 38.

As shown in the present figure, an acoustic loudspeaker serving also as speaking microphone 42, and an acoustic loudspeaker serving also as receiving speaker 43 are disposed on a portable information terminal 1.

As described above, when an acoustic loudspeaker is used as either a speaking microphone, or a receiving speaker, the number of parts to be used in a portable information terminal is reduced, so that downsizing and weight reduction of the portable information terminal can be realized.

Figure 41:
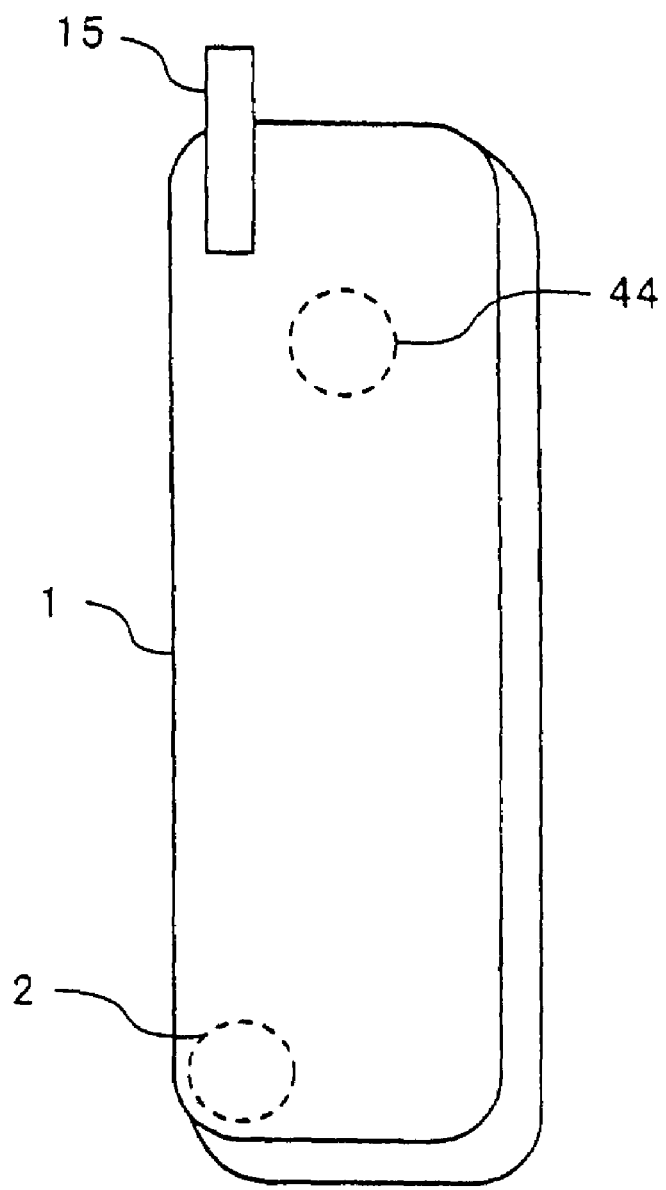
FIG. 41 is a view showing a third modified example of the nineteenth embodiment in FIG. 38.

FIG. 41 is a view showing a third modified example of the nineteenth embodiment in FIG. 38.

As shown in the present figure, an acoustic sound loud speaker 2, and an acoustic loudspeaker serving also as a ringer 44 for sounding incoming sounds are disposed on a portable information terminal 1.

As described above, when an acoustic loudspeaker is used also as a ringer, the number of parts to be used in a portable information terminal is reduced, so that downsizing and weight reduction of the portable information terminal can be realized.

Figure 42:
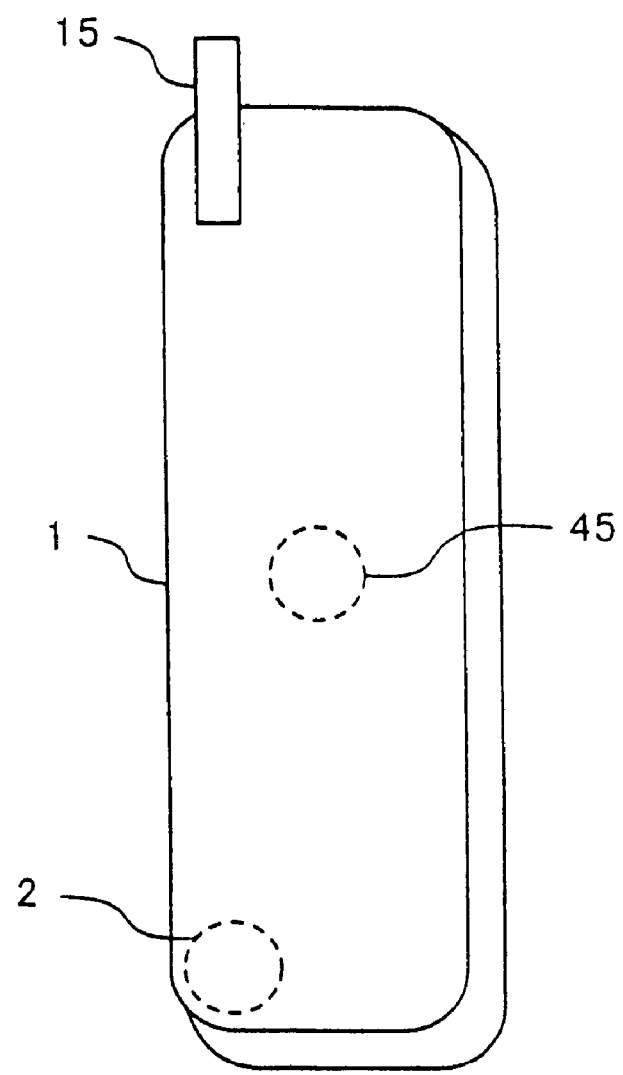
FIG. 42 is a view showing a fourth modified example of the nineteenth embodiment in FIG. 38.

FIG. 42 is a view showing a fourth modified example of the nineteenth embodiment in FIG. 38.

As shown in the present figure, an acoustic loudspeaker 2, and an acoustic loudspeaker serving also as a vibrator for vibrating to notify incoming signals 45 are disposed on a portable information terminal 1.

As described above, when an acoustic loudspeaker is used also as a vibrator, the number of parts to be used in a portable information terminal is reduced, so that downsizing and weight reduction of the portable information terminal can be realized.

Figure 43:
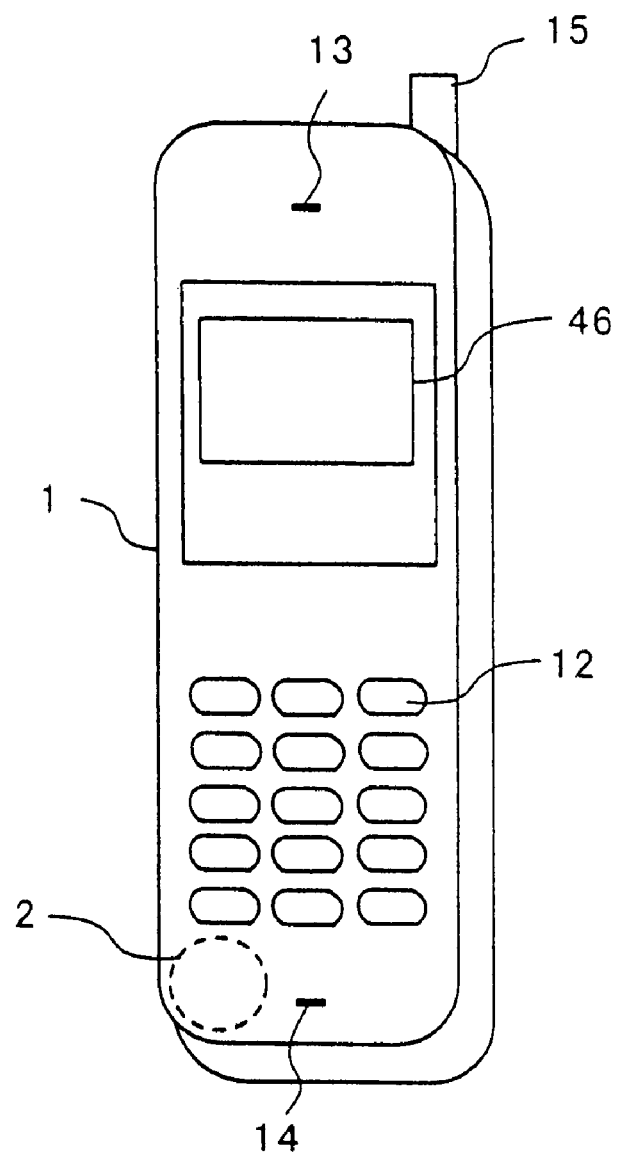
FIG. 43 is a view showing a fifth modified example of the nineteenth embodiment in FIG. 38.

FIG. 43 is a view showing a fifth modified example of the nineteenth embodiment in FIG. 38.

As shown in the present figure, an acoustic loudspeaker 2, and an acoustic loudspeaker serving also as a screen display monitor 46 are disposed on a portable information terminal 1.

As described above, when an acoustic loudspeaker is used also as a screen display monitor, the number of parts to be used in a portable information terminal is reduced, so that downsizing and weight reduction of the portable information terminal can be realized.

Figure 44:
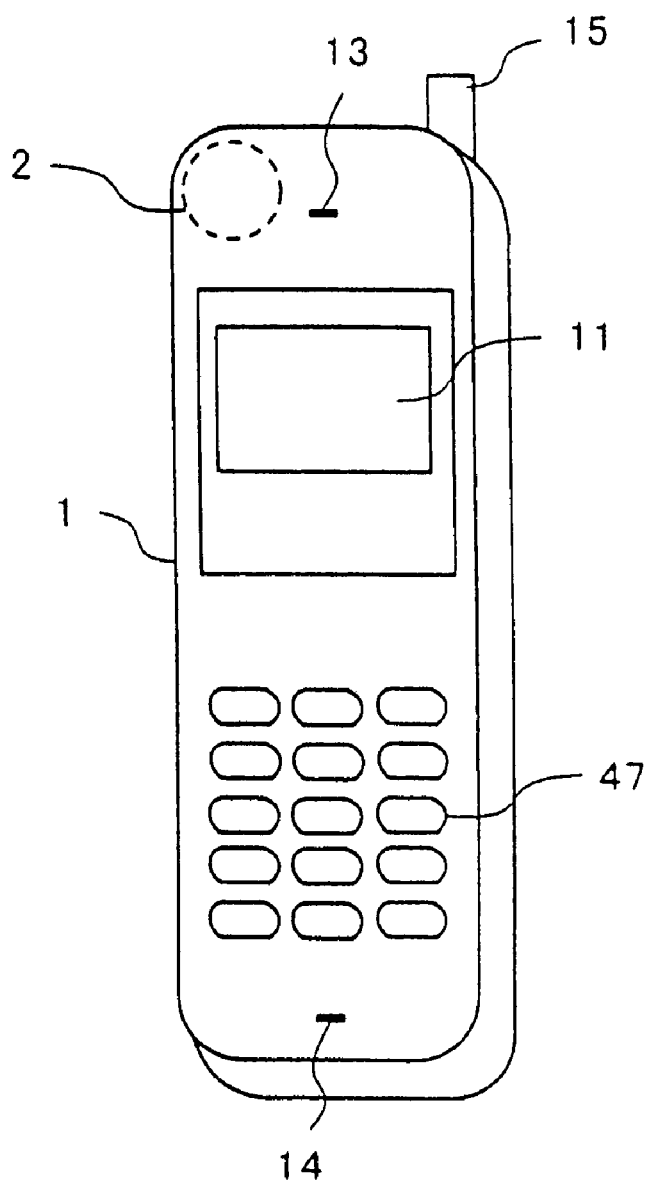
FIG. 44 is a view showing a sixth modified example of the nineteenth embodiment in FIG. 38.

FIG. 44 is a view showing a sixth modified example of the nineteenth embodiment in FIG. 38.

As shown in the present figure, an acoustic loudspeaker 2, and an acoustic loudspeaker serving also as a key panel 47 are disposed on a portable information terminal 1.

As described above, when an acoustic loudspeaker is used also as a key panel, the number of parts to be used in a portable information terminal is reduced, so that downsizing and weight reduction of the portable information terminal can be realized.

As to sound data reproduced in the above description, when sound data is handled in such that the one stored in a built-in memory, medium or the like housed in a portable information terminal 1 is reproduced, or sound data stored at the same time of reception from an external source such as a download site, and a personal computer (PC) is reproduced, the portable information terminal 1 is considered to have a constitution functioning as a sound source and also as an acoustic loudspeaker. According to such constitution, sound data is limited, and therefore, an available range for sound data is intended to expand as described hereinafter.

Figure 45:
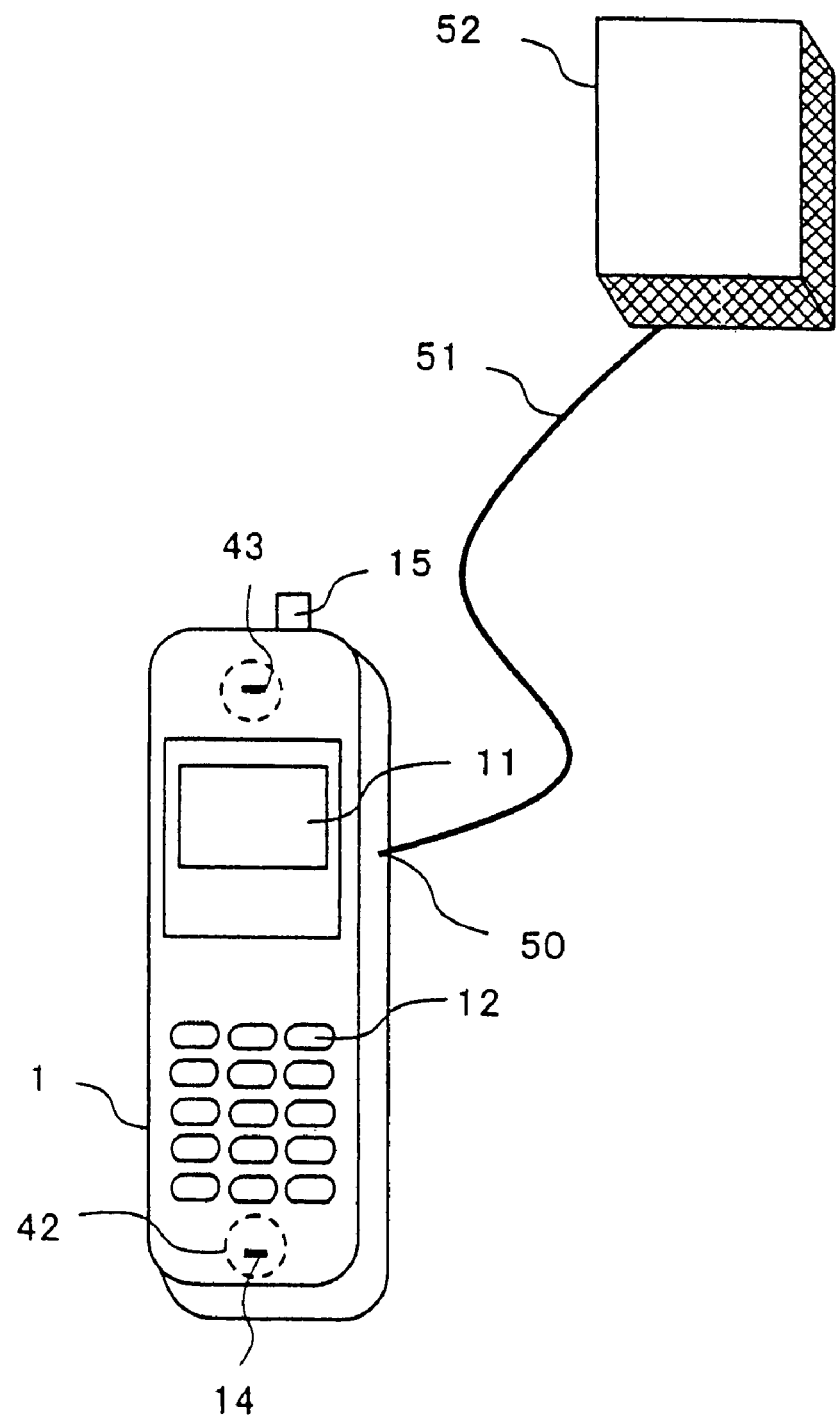
FIG. 45 is a view showing a schematic structure of a twentieth embodiment of a sound reproducing system in a portable information terminal according to the present invention.

FIG. 45 is a view showing a schematic structure of a twentieth embodiment of a sound reproducing system in a portable information terminal according to the present invention.

As shown in the present figure, in comparison with FIG. 40, a signal input terminal 50 is provided on a portable information terminal 1, and an acoustic signal generator 52 is connected to the signal input terminal 50 through a data receiving cable 51. The acoustic signal generator 52 is composed of a personal computer, deck, or the like.

According to the present invention, when the portable information terminal 1 is allowed to function as an external acoustic loudspeaker and adding a function for reproducing sounds from other sound source, the portable information terminal 1 becomes possible to respond much more sound data.

Furthermore, it is constituted as a first modified example in the twentieth embodiment of the invention in such that a plurality of acoustic sound generators 52 is connected to a portable information terminal 1, and any of acoustic sound generators is changed over by a switch as an input source, whereby sounds from a plurality of sound sources can be easily compared with each other, so that convenience is elevated.

Moreover, it is constituted as a second modified example in the twentieth embodiment of the invention in such that an acoustic loudspeaker serving also as speaking microphone 42, and an acoustic loudspeaker serving also as receiving speaker 43 are arranged to be loudspeakers capable of functioning with no use of amplifier in case of reproducing input signals from the outside, whereby it becomes possible to reproduce sounds in a condition where a power supply has been shut off in a portable information terminal 1 itself. As a result, electricity for the portable information terminal 1 is saved to increase a serviceable time for a single charge, whereby it becomes possible to reproduce sounds of high acousticity irrespective of a remaining amount of battery.

The same effect can be attained in case of employing usual acoustic loudspeakers in place of the above-described acoustic loudspeaker serving also as speaking microphone, and the acoustic loudspeaker serving also as receiving speaker.

Besides, it is constituted as a third modified example in the twentieth embodiment of the invention in such that a portable information terminal 1 acquires acoustic sound data from an acoustic sound signal generator 52 by means of radio wave, for example, BLUETOOTH™ wireless technology or the like. In this case, since no cable is used, a constitution of a system can be simplified.

Figure 46:
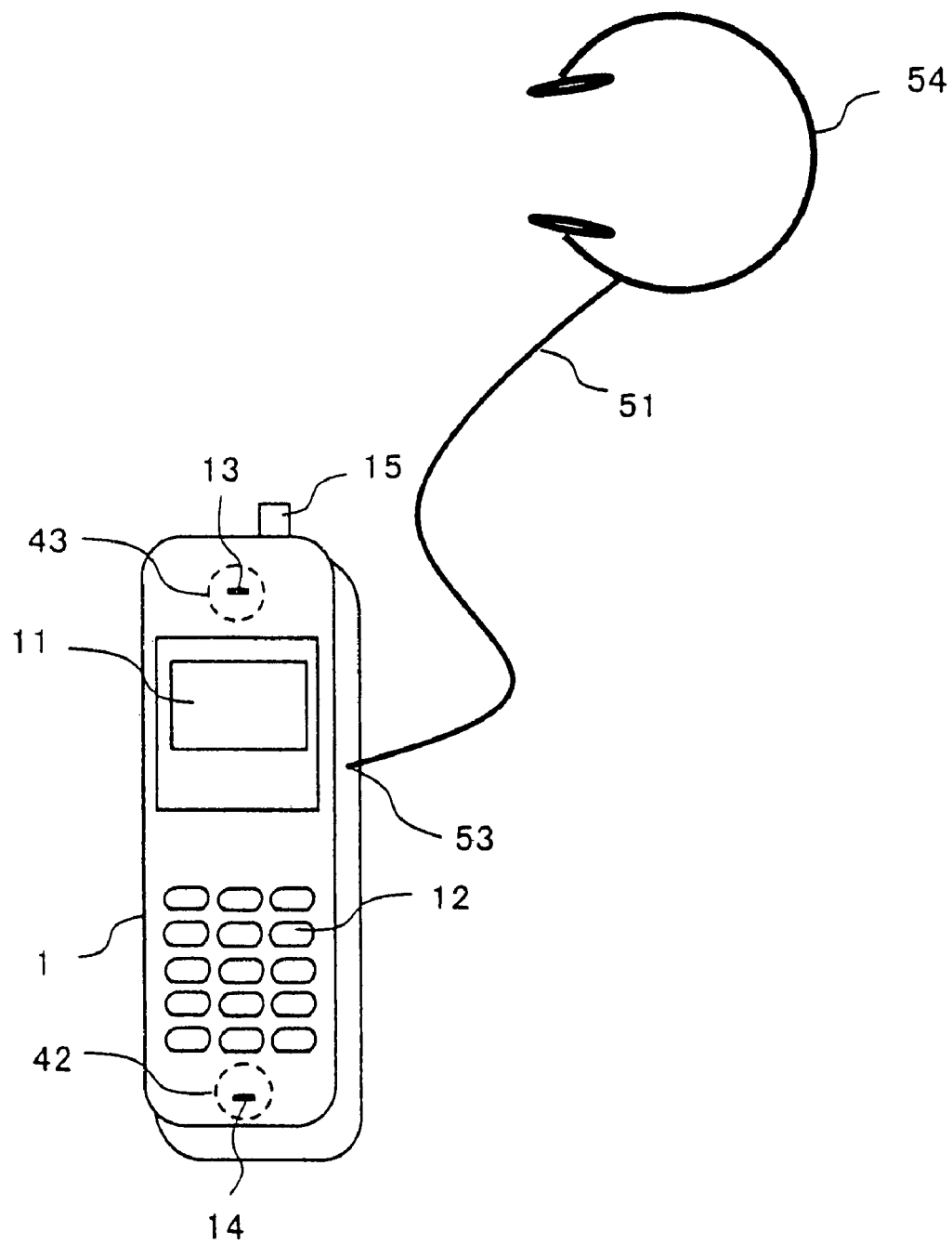
FIG. 46 is a view showing a schematic structure of a twenty first embodiment of a sound reproducing system in a portable information terminal according to the present invention.

FIG. 46 is a view showing a schematic structure of a twenty first embodiment of a sound reproducing system in a portable information terminal according to the present invention.

As shown in the present figures, in comparison with FIG. 40, a headphone-mounting terminal 53 is provided on a portable information terminal 1, and a headphone 54 is connected to the headphone-mounting terminal 53 through a data receiving cable 51.

According to such arrangement as described above, it is possible to listen stereo sounds by means of the headphone 54 in a place where sounds should not be produced in an environment such as public places, and library.

Moreover, it is constituted as a first modified example in the twenty first embodiment of the invention in such that reproduction sounds are reproduced from a receiving speaker in a portable information terminal 1, and at the same time, such sounds are transmitted together with telephone message to be reproduced from another receiving speaker of the communicating other party in a place such as public places where sounds should not be listened by the third party.

As a result, no remarkable harassment arises with respect to a surrounding area, and communication accompanied with comfortable BGM can be realized through telephone conversation.

Furthermore, when any of sounds of noise in station, hustle and bustle, pink gin in department store, lush house and the like is selected as a background effect, more pleasant communication can be promoted.

INDUSTRIAL APPLICABILITY

As described above, according to the present invention, a portable information terminal is provided with a plurality of acoustic loudspeakers, at least two of the acoustic loudspeakers are simultaneously driven while compensating their reproduced sounds with each other, so that comfortable and high-quality sounds can be reproduced by a single portable information terminal without using any headphone, earphone, external speaker system and the like, whereby a portable information terminal having high adaptability and high convenience with respect to operating environment can be realized.

The invention claimed is:

1. A reproducing system in a portable information terminal having an antenna, an ear piece, and a mouthpiece, the reproducing system comprising:
   at least two acoustic loudspeakers fixedly mounted to said portable information terminal so as to reduce acoustic crosstalk between said loudspeakers so that said loudspeakers are driven simultaneously to compensate their reproduced sounds with each other, the acoustic crosstalk generated by interference of respective acoustic waves radiated from said loudspeakers during propagation through the air,
   wherein said portable information terminal is a radio telephone such as cellular phone; a personal handy phone system; a cordless phone; a cordless handset of an extension phone; or a personal digital assistant.

2. The reproducing system in a portable information terminal as claimed in claim 1 wherein said at least two acoustic loudspeakers are either disposed on said portable information terminal in a longitudinal direction thereof, or disposed diagonally at the opposite ends of the portable information terminal.

3. The reproducing system in a portable information terminal as claimed in claim 1 wherein at least one member selected from said at least two acoustic loudspeakers is located at a certain angle with respect to a cabinet wall of said portable information terminal.

4. The reproducing system in a portable information terminal as claimed in claim 1 wherein an angle defined by at least one acoustic loudspeaker selected from said at least two acoustic loudspeakers and said cabinet wall of the portable information terminal can be freely changed.

5. The reproducing system in a portable information terminal as claimed in claim 1 wherein each angle of said at least two acoustic loudspeakers may be freely changed.

6. The reproducing system in a portable information terminal as claimed in claim 1 wherein a cross talk barrier is placed between said at least two acoustic loudspeakers, and said cross talk barrier prevents from generating cross talk from individual acoustic loudspeakers.

7. The reproducing system in a portable information terminal as claimed in claim 6 wherein said cross talk barrier is collapsible or detachable.

8. The reproducing system in a portable information terminal as claimed in claim 1 wherein said portable information terminal is provided with a signal processing circuit for eliminating cross talk; and said signal processing circuit for eliminating cross talk processes input signals of said at least two acoustic loudspeakers to eliminate cross talk.

9. The reproducing system in a portable information terminal as claimed in claim 1 wherein at least one member selected from said at least two acoustic loudspeakers is located at a recessed position from a position of a cabinet wall of the portable information terminal.

10. The reproducing system in a portable information terminal as claimed in claim 9 wherein either a part or the whole of said at least one acoustic loudspeaker is covered with a perforated section of a cabinet wall of said portable information terminal, or a cabinet wall covering a vibrating surface of said loudspeaker is removed.

11. The reproducing system in a portable information terminal as claimed in claim 1 wherein at least one acoustic loudspeaker selected from said at least two acoustic loudspeakers is protruded from a side of opposite ends of said portable information terminal.

12. The reproducing system in a portable information terminal as claimed in claim 11 wherein said at least one acoustic loudspeaker is located at a deeper position from the front of said portable information terminal; and either a part of said at least one acoustic loudspeaker is covered with a perforated section of a cabinet wall of said portable information terminal, or a cabinet wall covering a vibrating surface of said at least one acoustic loudspeaker is removed.

13. The reproducing system in a portable information terminal as claimed in claim 11 wherein said at least one protruded acoustic loudspeaker is contained inside said portable information terminal.

14. The reproducing system in a portable information terminal as claimed in claim 1 wherein said at least two acoustic loudspeakers are arranged in a row of a speaker array in said portable information terminal.

15. The reproducing system in a portable information terminal as claimed in claim 1 wherein said at least two acoustic loudspeakers are arranged in said portable information terminal so as to direct different directions from one another.

16. The reproducing system in a portable information terminal as claimed in claim 15 wherein said at least two acoustic loudspeakers reproduce sounds in such that different sounds are listened individually in different directions.

17. The reproducing system in a portable information terminal as claimed in claim 1 wherein said portable information terminal is provided with a signal processing circuit for converging directivity; and said signal processing circuit for converging directivity processes input signals of said at least two acoustic loudspeakers to converge directions of directivity.

18. The reproducing system in a portable information terminal as claimed in claim 1 wherein said portable information terminal is provided with an omnidirectional signal processing circuit; and said omnidirectional signal processing circuit processes input signals of said at least two acoustic loudspeakers to make them omnidirectional.

19. The reproducing system in a portable information terminal as claimed in claim 1 wherein said portable information terminal is provided with a signal processing circuit for converging directions of said at least two acoustic loudspeakers with respect to their directivities and an omnidirectional signal processing circuit for making said at least two acoustic loudspeakers omnidirectional; and said signal processing circuit for converging directivity and said omnidirectional signal processing circuit are selected alternatively.

20. The reproducing system in a portable information terminal as claimed in claim 1 wherein said at least two acoustic loudspeakers having high efficiency are used, whereby it becomes possible to drive said at least two acoustic loudspeakers in case of reproducing sounds without employing any amplifier.

21. The reproducing system in a portable information terminal as claimed in claim 1 wherein individual sounds are reproduced from said at least two acoustic loudspeakers; and sound volumes of the individual sounds can be uniquely adjusted.

22. The reproducing system in a portable information terminal as claimed in claim 1 wherein said at least two acoustic loudspeakers have characteristics specialized to middle- to high-pitched tone ranges, and that specialized to a low-pitched tone range, respectively.

23. The reproducing system in a portable information terminal as claimed in claim 1 wherein at least one member selected from said at least two acoustic loudspeakers is arranged in such that when said portable information terminal is placed to be in contact with a plane including a desk, a floor, and a wall surface, said at least one acoustic loudspeaker can utilize reflection of sounds.

24. The reproducing system in a portable information terminal as claimed in claim 1 wherein at least one member selected from said at least two acoustic loudspeakers can reproduce sounds simultaneously with a phone call by means of said portable information terminal.

25. The reproducing system in a portable information terminal as claimed in claim 1 wherein acoustic sound reproducing signals of said at least one acoustic loudspeaker are transmitted so as to be able to listen also by the other party of communication.

26. The reproducing system in a portable information terminal as claimed in claim 1 wherein at least one member selected from said at least two acoustic loudspeakers is the one serving both as a acoustic loudspeaker and a device of said portable information terminal including an acoustic loudspeaker serving also as a speaking microphone, an acoustic loudspeaker serving also as a receiving speaker, an acoustic loudspeaker serving also as a ringer, an acoustic loudspeaker serving also as a vibrator, an acoustic loudspeaker serving also as a screen display monitor, and an acoustic loudspeaker serving also as a key panel.

27. The reproducing system in a portable information terminal as claimed in claim 1 wherein an acoustic signal generator is connected to said portable information terminal; said acoustic signal generator stores acoustic sound data; and said at least two acoustic loudspeakers reproduce sounds based on said acoustic sound data obtained from said acoustic signal generator.

28. The reproducing system in a portable information terminal as claimed in claim 27 wherein a plurality of said acoustic signal generators is connected to said portable information terminal; and any of the acoustic signal generators from which data is to be acquired is changed over by a switch.

29. The reproducing system in a portable information terminal as claimed in claim 27 wherein said at least two acoustic loudspeakers are allowed to be able to reproduce sounds without employing any amplifier; and they are made to be able to reproduce sounds of said acoustic sound data obtained from said acoustic signal generator in a condition where a power supply in said portable information terminal itself has been shut off.

30. The reproducing system in a portable information terminal as claimed in claim 27 wherein said portable information terminal acquires data from said acoustic signal generator through radio wave.

31. The reproducing system in a portable information terminal as claimed in claim 1 wherein said portable information terminal is extensible.

32. The reproducing system in a portable information terminal as claimed in claim 1 wherein said portable information terminal is collapsible.

33. The reproducing system in a portable information terminal as claimed in claim 1, wherein said portable information terminal further comprises a cabinet having a first side, and wherein said at least two acoustic loudspeakers are disposed on said first side of said cabinet.

34. The reproducing system in a portable information terminal as claimed in claim 1, wherein said portable information terminal further comprises a cabinet having a first side and a second side, said second side being opposite said first side, and wherein one of said at least two acoustic loudspeakers is disposed on said first side of said cabinet and another of said at least two acoustic loudspeakers is disposed on said second side of said cabinet.

35. A portable information terminal, comprising:
an antenna;
an earpiece;
a mouthpiece; and
at least two acoustic loudspeakers, said loudspeakers being fixedly mounted to said portable information terminal so as to reduce acoustic crosstalk between said loudspeakers so that said loudspeakers are driven simultaneously to compensate their reproduced sounds with each other, wherein said loudspeakers produce a synthesized sound.

36. A portable information terminal, comprising:
an antenna;
an earpiece;
a mouthpiece;
a cabinet having a cabinet wall; and
at least two acoustic loudspeakers, each of said loudspeakers being fixedly mounted to said portable information terminal so as to reduce acoustic crosstalk between said loudspeakers to allow said loudspeakers to be driven simultaneously to compensate their reproduced sounds with each other,
wherein a surface of each loudspeaker is equal to or lower than a surface of the cabinet wall.

37. The reproducing system in a portable information terminal as claimed in claim 1 wherein the at least two acoustic loudspeakers are arranged to have a maximum distance therebetween within a dimensional limitation of a casing of the portable information terminal, to separate the acoustic signals of the respective loudspeakers.

38. The reproducing system in a portable information terminal as claimed in claim 1 wherein a partition is provided between the at least two acoustic loudspeakers, to separate the acoustic signals.

39. The portable information terminal of claim 35, wherein the acoustic crosstalk is generated by interference of respective acoustic waves radiated from said loudspeakers during propagation through the air.

40. The portable information terminal of claim 36, wherein the acoustic crosstalk is generated by interference of respective acoustic waves radiated from said loudspeakers during propagation through the air.

* * * * *